United States Patent
Karpinskyy et al.

(10) Patent No.: US 12,189,830 B2
(45) Date of Patent: *Jan. 7, 2025

(54) INTEGRATED CIRCUIT FOR SECURITY OF A PHYSICALLY UNCLONABLE FUNCTION AND A DEVICE INCLUDING THE SAME

(71) Applicant: SAMSUNG ELECTRONICS CO., LTD., Suwon-si (KR)

(72) Inventors: Bohdan Karpinskyy, Suwon-si (KR); Yong-ki Lee, Yongin-si (KR); Ji-eun Park, Suwon-si (KR); Kyoung-moon Ahn, Seoul (KR); Yun-hyeok Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

This patent is subject to a terminal disclaimer.

(21) Appl. No.: 17/847,593

(22) Filed: Jun. 23, 2022

(65) Prior Publication Data

US 2022/0318436 A1    Oct. 6, 2022

Related U.S. Application Data

(63) Continuation of application No. 16/553,318, filed on Aug. 28, 2019, now Pat. No. 11,403,432.

(30) Foreign Application Priority Data

Dec. 31, 2018    (KR) .................. 10-2018-0174127

(51) Int. Cl.
*G06F 21/75*    (2013.01)
*G06F 21/56*    (2013.01)
(Continued)

(52) U.S. Cl.
CPC ............ *G06F 21/75* (2013.01); *G06F 21/566* (2013.01); *G06F 21/72* (2013.01); *H01L 23/576* (2013.01);
(Continued)

(58) Field of Classification Search
None
See application file for complete search history.

(56) References Cited

U.S. PATENT DOCUMENTS 8,683,210 B2    3/2014    Devadas
8,782,432 B2    7/2014    Oshida et al.
(Continued)

FOREIGN PATENT DOCUMENTS

CN    104657630    5/2015
CN    105184191    12/2015
(Continued)

OTHER PUBLICATIONS

Office Action issued in corresponding TW Patent Application No. 108138184 on Apr. 20, 2023.
(Continued)

*Primary Examiner* — Michael Pyzocha
(74) *Attorney, Agent, or Firm* — F. CHAU & ASSOCIATES, LLC

(57) ABSTRACT

An integrated circuit including: a plurality of physically unclonable function (PUF) cells each configured to generate a cell signal having a unique value; a selector configured to output a first signal obtained by not inverting a cell signal output by a PUF cell selected from the plurality of PUF cells and a second signal obtained by inverting the cell signal; and a key generator configured to generate a security key in response to the first signal or the second signal, wherein the selector includes a first conversion circuit configured to generate the first signal and a second conversion circuit
(Continued)

having the same structure as the first conversion circuit and configured to generate the second signal.

21 Claims, 16 Drawing Sheets

(51) Int. Cl.
    *G06F 21/72*     (2013.01)
    *H01L 23/00*     (2006.01)
    *H03K 19/173*     (2006.01)
    *H04L 9/08*     (2006.01)
    *H03K 19/21*     (2006.01)

(52) U.S. Cl.
    CPC ....... *H03K 19/1737* (2013.01); *H04L 9/0866* (2013.01); *G06F 2221/034* (2013.01); *H03K 19/21* (2013.01)

(56) References Cited

U.S. PATENT DOCUMENTS

| | | | |
|---|---|---|---|
| 9,083,323 | B2 | 7/2015 | Guo et al. |
| 9,279,850 | B1 | 3/2016 | Pederson |
| 9,444,618 | B1* | 9/2016 | Trimberger ........... H04L 9/3278 |
| 9,628,272 | B2 | 4/2017 | Rostami et al. |
| 9,742,563 | B2 | 8/2017 | Gotze et al. |
| 9,806,718 | B2 | 10/2017 | Wallrabenstein |
| 9,948,470 | B2 | 4/2018 | Guo et al. |
| 10,027,472 | B2 | 7/2018 | Suresh et al. |
| 10,027,480 | B2 | 7/2018 | Lee et al. |
| 10,742,221 | B2 | 8/2020 | Usuda et al. |
| 11,038,680 | B2 | 6/2021 | Danger et al. |
| 11,115,202 | B2 | 9/2021 | Lee et al. |
| 11,362,845 | B2 | 6/2022 | Lu et al. |
| 2010/0322418 | A1 | 12/2010 | Potkonjak |
| 2011/0050279 | A1 | 3/2011 | Koushanfar et al. |
| 2011/0299678 | A1 | 12/2011 | Deas et al. |
| 2012/0045061 | A1 | 2/2012 | Danger et al. |
| 2012/0072737 | A1 | 3/2012 | Schrijen et al. |
| 2012/0093308 | A1 | 4/2012 | Choi |
| 2013/0047209 | A1 | 2/2013 | Satoh et al. |
| 2015/0067895 | A1 | 3/2015 | Vasyltsov et al. |
| 2015/0143130 | A1 | 5/2015 | Ducharme et al. |
| 2015/0188717 | A1 | 7/2015 | Wu et al. |
| 2015/0195088 | A1* | 7/2015 | Rostami ............... H04L 9/3278 380/28 |
| 2016/0156476 | A1* | 6/2016 | Lee ....................... H04L 9/0866 380/44 |
| 2017/0048072 | A1 | 2/2017 | Cambou |
| 2017/0180140 | A1 | 6/2017 | Mai et al. |
| 2018/0091293 | A1 | 3/2018 | Suresh et al. |
| 2018/0131527 | A1 | 5/2018 | Lu et al. |
| 2018/0131528 | A1* | 5/2018 | Profumo ............... H04L 9/0866 |
| 2018/0176025 | A1* | 6/2018 | Suresh .................. H04L 9/3278 |
| 2018/0191353 | A1* | 7/2018 | Su ..................... H03K 19/17768 |
| 2018/0293052 | A1* | 10/2018 | Suresh .................. H04L 9/0866 |
| 2018/0337793 | A1 | 11/2018 | Park et al. |
| 2019/0058602 | A1 | 2/2019 | Wang et al. |
| 2019/0065734 | A1* | 2/2019 | Yao ........................ G06F 21/31 |
| 2019/0068190 | A1 | 2/2019 | Karpinskyy et al. |
| 2019/0081804 | A1* | 3/2019 | Chen ....................... G11C 7/062 |
| 2019/0140643 | A1* | 5/2019 | Kuenemund ......... H04L 9/0866 |
| 2019/0158299 | A1* | 5/2019 | Poo ....................... H04L 9/0861 |
| 2019/0378575 | A1 | 12/2019 | Lu |
| 2020/0052893 | A1 | 2/2020 | Lu et al. |
| 2020/0104101 | A1* | 4/2020 | Satpathy ............... G06F 21/755 |
| 2020/0145235 | A1* | 5/2020 | Choi ....................... H04L 9/12 |
| 2020/0210628 | A1 | 7/2020 | Karpinskyy et al. |
| 2020/0213281 | A1 | 7/2020 | Mondello et al. |
| 2021/0004461 | A1* | 1/2021 | Guilley ............... G06F 11/3082 |

FOREIGN PATENT DOCUMENTS

| | | |
|---|---|---|
| CN | 107491704 | 12/2017 |
| CN | 108243008 | 7/2018 |
| CN | 108616358 | 10/2018 |
| CN | 108880818 | 11/2018 |
| JP | 2015-139010 A2 | 7/2015 |
| JP | 2017-183944 A | 10/2017 |
| JP | 2018-121141 | 8/2018 |
| KR | 10-2015-0026737 A | 3/2015 |
| KR | 10-2015-0137375 | 12/2015 |
| KR | 10-2018-0125860 A | 11/2018 |
| TW | 201822062 | 6/2018 |
| WO | 2015026838 | 2/2015 |

OTHER PUBLICATIONS

Corresponding Korean Office Action dated Dec. 4, 2023 issued in Application No. 10-2018-0174127.

Office Action issued in corresponding CN Patent Application No. 201910743005.6 on Oct. 12, 2023.

* cited by examiner

INTEGRATED CIRCUIT FOR SECURITY OF A PHYSICALLY UNCLONABLE FUNCTION AND A DEVICE INCLUDING THE SAME

CROSS-REFERENCE TO RELATED APPLICATIONS

This application is a continuation of U.S. patent application Ser. No. 16/553,318 filed on Aug. 28, 2019, which claims priority under 35 U.S.C. § 119 to Korean Patent Application No. 10-2018-0174127, filed on Dec. 31, 2018, in the Korean Intellectual Property Office, the disclosures of which are incorporated by reference herein in their entireties.

TECHNICAL FIELD

The inventive concept relates to a physically unclonable function, and more particularly, to an integrated circuit for security of a physically unclonable function and a device including the same.

DISCUSSION OF RELATED ART

A physical unclonable function (PUF) (sometimes also called physically unclonable function) may provide a unique value corresponding to hardware based on an intrinsic characteristic of the hardware. For example, although a plurality of hardware components such as semiconductor chips are manufactured by the same process, unique physical variations may occur naturally in the manufacture of the plurality of hardware components. Based on these variations, the unique value of the hardware may be extracted and the extracted value may be used for an application that needs security, for example, secure communication, secure data processing, user identification, and firmware update. Parts that provide the PUF may be designed to have high entropy or low predictability and to provide an effective countermeasure against a side-channel attack (SCA), such that the unique value cannot be discovered.

SUMMARY

According to an exemplary embodiment of the inventive concept, there is provided an integrated circuit (1C) including: a plurality of physically unclonable function (PUF) cells each configured to generate a cell signal having a unique value; a selector configured to output a first signal obtained by not inverting a cell signal output by a PUF cell selected from the plurality of PUF cells and a second signal obtained by inverting the cell signal; and a key generator configured to generate a security key in response to at least one of the first signal and the second signal, wherein the selector includes a first conversion circuit configured to generate the first signal and a second conversion circuit having the same structure as the first conversion circuit and configured to generate the second signal.

According to an exemplary embodiment of the inventive concept, there is provided an IC including: a selection signal generator configured to generate a first selection signal; a plurality of PUF blocks each configured to receive the first selection signal; and a key generator configured to generate a security key based on at least one of a plurality of output signals simultaneously output by the plurality of PUF blocks, wherein each of the plurality of PUF blocks includes a plurality of PUF cells configured to generate cell signals having unique values, respectively, and each of the PUF blocks is configured to generate an output signal based on a cell signal output by a PUF cell selected from the PUF cells in response to the first selection signal.

According to an exemplary embodiment of the inventive concept, there is provided an IC for security of a PUF, including a plurality of PUF cells each configured to generate a cell signal having a unique value, a selection signal generator configured to generate a selection signal so that the plurality of PUF cells are respectively selected at randomly delayed points in time, and a key generator configured to generate a security key based on a cell signal of a selected PUF cell.

According to an exemplary embodiment of the inventive concept, there is provided an IC including: a plurality of PUF blocks, each PUF block including a plurality of PUF cells; a selection signal generator configured to generate a first selection signal and a second selection signal, the first selection signal being input to each of the PUF blocks; a multiplexer configured to select an output signal of the PUF blocks in response to the second selection signal provided from the selection signal generator; and a key generator configured to generate a security key based on the output signal selected by the multiplexer.

BRIEF DESCRIPTION OF THE DRAWINGS

The above and other features of the inventive concept will be more clearly understood by describing in detail exemplary embodiments thereof with reference to the accompanying drawings in which.

DETAILED DESCRIPTION OF THE EMBODIMENTS

Figure 1:
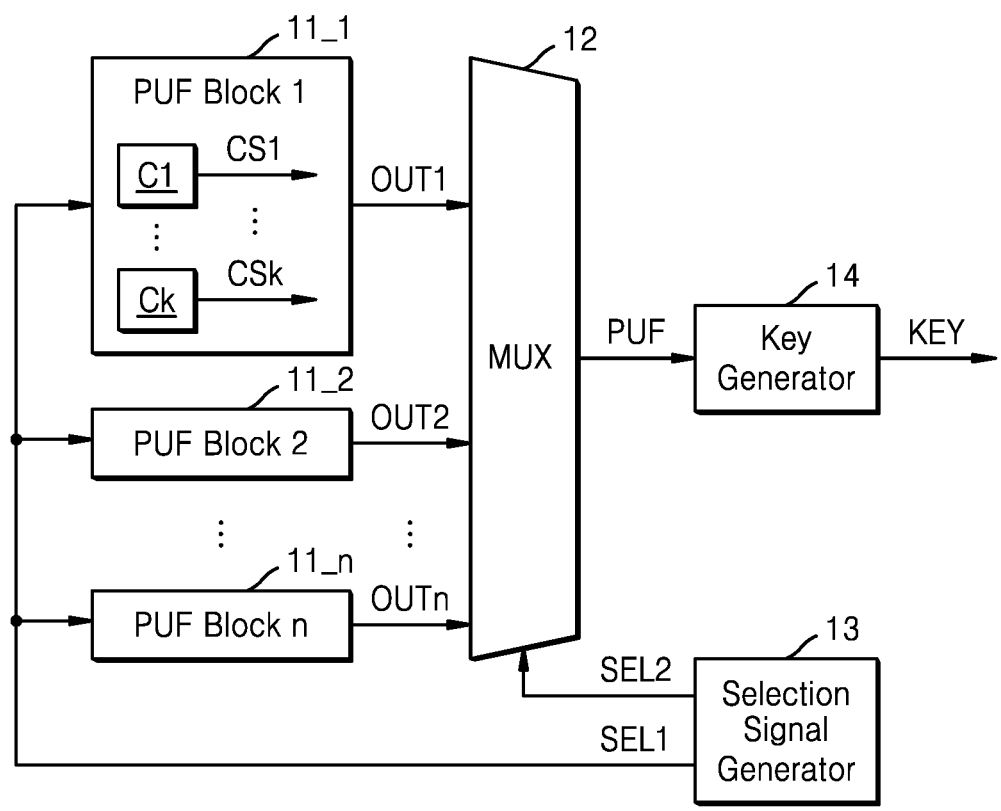
FIG. 1 is a block diagram illustrating an integrated circuit according to an exemplary embodiment of the inventive concept.

FIG. 1 is a block diagram illustrating an integrated circuit 10 according to an exemplary embodiment of the inventive concept. The integrated circuit 10 for security of a physically unclonable function (PUF) may generate a security key KEY requested to be secured as illustrated in FIG. 1. As illustrated in FIG. 1, the integrated circuit 10 may include a plurality of PUF blocks 11_1, 11_2, . . . , and 11_n, a multiplexer (MUX) 12, a selection signal generator 13, and a key generator 14. In some embodiments of the inventive concept, the integrated circuit 10 may be manufactured through a semiconductor process and components of the integrated circuit 10 may be packaged in a single package or two or more packages.

Referring to FIG. 1, the plurality of PUF blocks 11_1, 11_2, . . . , and 11_n may generate a plurality of output signals OUT1, OUT2, . . . , and OUTn, respectively, (n is an integer greater than 1). In some embodiments of the inventive concept, the plurality of PUF blocks 11_1, 11_2, . . . , and 11_n may be designed by logic synthesis and may be implemented as digital logics. For example, the plurality of PUF blocks 11_1, 11_2, . . . , and 11_n may be designed with reference to a standard cell library that defines various logic gates and may respectively include instances of the same logic gate to have the same structure.

Each of the plurality of PUF blocks 11_1, 11_2, . . . , and 11_n may include a plurality of PUF cells. For example, as illustrated in FIG. 1, the PUF block 11_1 may include the plurality of PUF cells C1, . . . , and Ck (k is an integer greater than 1) and accordingly, the integrated circuit 10 may include n*k PUF cells. The plurality of PUF cells C1, . . . , and Ck may generate a plurality of cell signals CS1, . . . , and CSk having unique values, respectively. As described later with reference to FIGS. 2A and 2B, the PUF cell (for example, C1) may include a plurality of PUF units for respectively outputting signals having unique levels. Accordingly, the cell signal (for example, CS1) output by the PUF cell (for example, C1) may have a unique value due to various variations that occur in a process of manufacturing the integrated circuit 10. For example, elements (for example, transistors) and/or patterns included in the plurality of PUF cells C1, . . . , and Ck may have unique characteristics different from those of a plurality of PUF cells of another integrated circuit manufactured by the same semiconductor process due to variations such as a height, a width, a length, and a doping concentration. Therefore, the plurality of cell signals CS1, . . . , and CSk may have unique values, respectively, and may be used for generating the security key KEY.

Security of an operation of obtaining the plurality of cell signals CS1, . . . , and CSk from the plurality of PUF cells C1, . . . , and Ck, in other words, an operation of reading each of the unique values of the plurality of cell signals CS1, . . . , and CSk (also referred to as an operation of reading the plurality of PUF cells C1, . . . , and Ck) may be needed. For example, in a side-channel attack (SCA), there may be an attempt to obtain the plurality of cell signals CS1, . . . , and CSk and/or the security key KEY by using a response to power consumption that occurs in the integrated circuit 10, an electromagnetic field, or an intentionally applied fault or by using machine learning based on various parameters measured by the integrated circuit 10. Therefore, the plurality of cell signals CS1, . . . , and CSk having high entropy and low predictability and which are an effective countermeasure against the SCA (also referred to as an attack) may be requested in a process of reading the plurality of PUF cells C1, . . . , and Ck. As described hereinafter, the integrated circuit according to exemplary embodiments of the inventive concept may increase the security of the PUF by reducing the predictability of the operation of reading the plurality of PUF cells C1, . . . , and Ck.

As illustrated in FIG. 1, the plurality of PUF blocks 11_1, 11_2, . . . , and 11_n may commonly receive a first selection signal SEL1 from the selection signal generator 13 and one of the plurality of PUF cells may be selected in response to the first selection signal SEL1. For example, one of the plurality of PUF cells C1, . . . , and Ck of the PUF block 11_1 may be selected in response to the first selection signal SEL1 and a first output signal OUT1 corresponding to a cell signal output by the selected PUF cell may be generated. Therefore, the plurality of PUF blocks 11_1, 11_2, . . . , and 11_n may simultaneously generate a plurality of output signals OUT1, OUT2, . . . , and OUTn, respectively, and power consumptions of the plurality of PUF blocks 11_1, 11_2, . . . , and 11_n may be equal regardless of the first selection signal SEL1. As a result, predictability of the power consumptions of the plurality of PUF blocks 11_1, 11_2, . . . , and 11_n may be reduced. An example of a PUF block will be described later with reference to FIGS. 3 and 4.

In some embodiments of inventive concept, the plurality of PUF blocks 11_1, 11_2, . . . , and 11_n may be divided into two or more groups, and each of the two or more groups has the same number of PUF blocks. The selection signal generator 13 may provide the two or more groups with additional selection signals respectively to enable one of the two or more groups, and PUF blocks included in an enabled group may generate output signals. For example, when the integrated circuit 10 may include four PUF blocks, i.e., n=4, the four PUF blocks may be divided into a first group including two PUF blocks 11_1 and 11_2 and a second group including another two PUF blocks. The second selection signal SEL2 may select each of the two PUF blocks 11_1 and 11_2 sequentially when the first group is enabled by the selection signal generator 13. Similarly, the second selection signal SEL2 may select each of the another two PUF blocks sequentially when the second group is enabled by the selection signal generator 13. Therefore, two PUF blocks among the four PUF blocks may generate output signals and power is always consumed by two PUF blocks. As a result, predictability of the power consumptions of the plurality of PUF blocks 11_1, 11_2, . . . , and 11_n may be reduced.

The multiplexer 12 may receive the plurality of output signals OUT1, OUT2, . . . , and OUTn from the plurality of PUF blocks 11_1, 11_2, . . . , and 11_n, respectively, and may provide a PUF signal PUF corresponding to one of the plurality of output signals OUT1, OUT2, . . . , and OUTn to the key generator 14 in accordance with a second selection signal SEL2 received from the selection signal generator 13.

The multiplexer 12 may have an arbitrary structure for selecting one of the plurality of output signals OUT1, OUT2, . . . , and OUTn in response to the second selection signal SEL2. The inventive concept is not limited thereto.

The selection signal generator 13 may generate the first selection signal SEL1 and the second selection signal SEL2. In some embodiments of the inventive concept, the selection signal generator 13 may generate the first selection signal SEL1 and the second selection signal SEL2 to select all of the n*k PUF cells included in the plurality of PUF blocks 11_1, 11_2, . . . , and 11_n. The selection signal generator 13 may generate the first selection signal SEL1 so that the plurality of PUF cells C1, . . . , and Ck included in the PUF block (for example, 11_1) are selected one by one with nothing omitted. For example, the selection signal generator 13 may generate the first selection signal SEL1 so that the plurality of PUF cells C1, . . . , and Ck are sequentially selected. In addition, the selection signal generator 13 may generate the second selection signal SEL2 so that the plurality of PUF blocks 11_1, 11_2, . . . , and 11_n are selected one by one with nothing omitted.

In some embodiments of the inventive concept, the selection signal generator 13 may generate the first selection signal SEL1 and/or the second selection signal SEL2 to reduce the predictability of an operation of reading a PUF cell. For example, the selection signal generator 13 may select the plurality of PUF cells C1, . . . , and Ck with nothing omitted at differently delayed points in time. Therefore, the predictability of the operation of reading the PUF cell may be reduced. An example of the selection signal generator 13 will be described later with reference to FIG. 10.

The key generator 14 may receive the PUF signal PUF from the multiplexer 12 and may generate the security key KEY based on the PUF signal PUF. In some embodiments of the inventive concept, the key generator 14 may repeatedly receive the PUF signal PUF and may collect values of the PUF signal PUF corresponding to different PUF cells. The key generator 14 may generate the security key KEY by performing an arbitrary method, for example, modular arithmetic on the collected values of the PUF signal PUF.

Figure 2A:
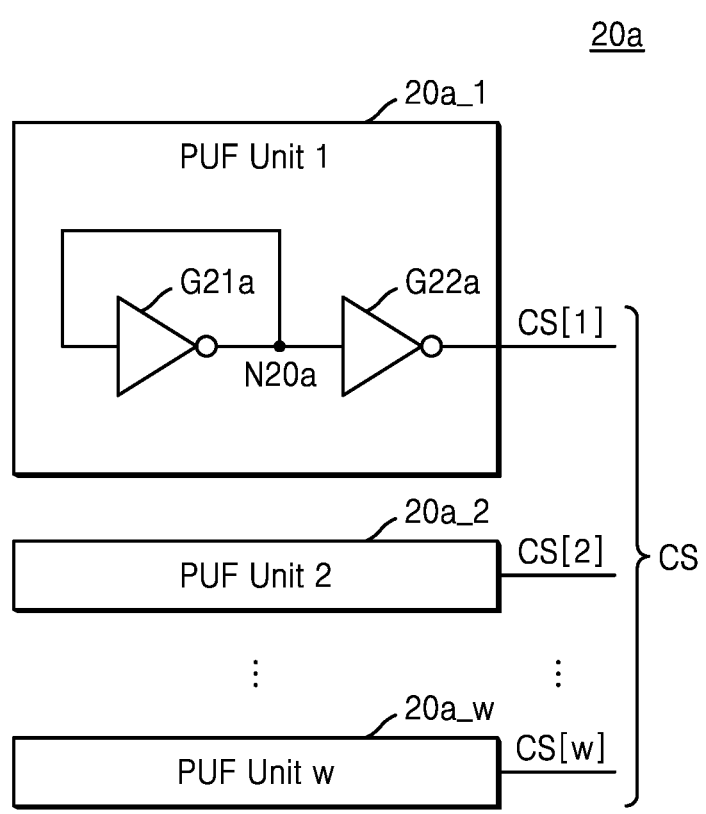
FIGS. 2A and 2B are block diagrams illustrating physical unclonable function (PUF) cells according to exemplary embodiments of the inventive concept.
Figure 2B:
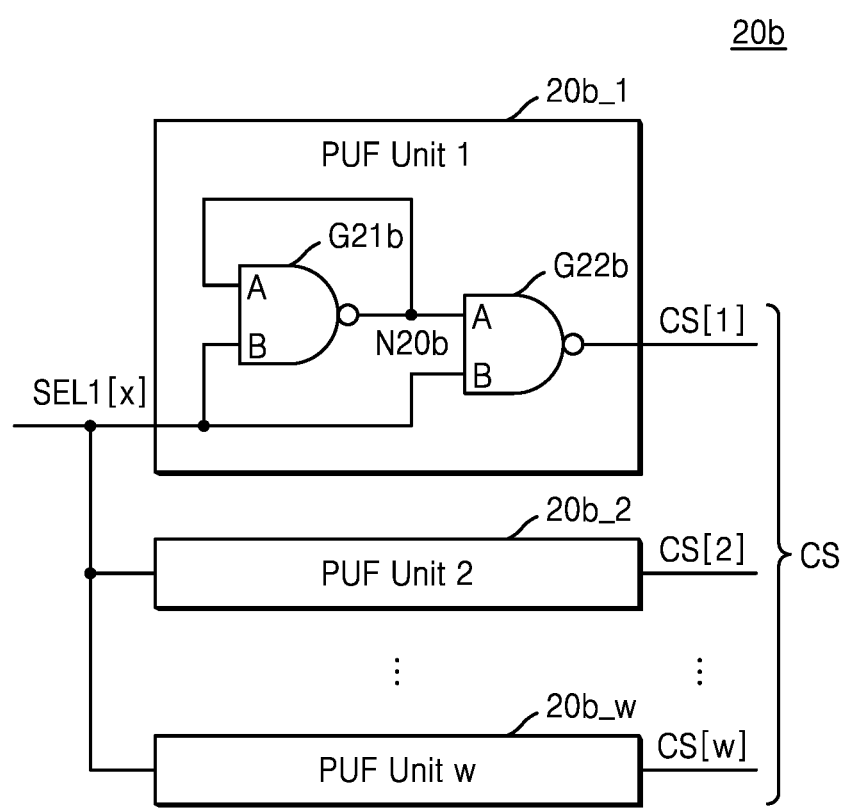

FIGS. 2A and 2B are block diagrams illustrating physical unclonable function (PUF) cells 20a and 20b, respectively, according to exemplary embodiments of the inventive concept. As described above with reference to FIG. 1, each of the PUF cells 20a and 20b of FIGS. 2A and 2B may include a PUF unit for generating a signal at a unique level. Hereinafter, FIGS. 2A and 2B will be described with reference to FIG. 1 and descriptions of the same components as those in FIG. 1 will not be given.

Referring to FIG. 2A, the PUF cell 20a may include a plurality of PUF units 20a_1, and 20a_w and each of the plurality of PUF units 20a_1, . . . , and 20a_w may generate a bit of a cell signal CS. In some embodiments of the inventive concept, the PUF unit may include two or more logic gates and may generate a signal at a unique level based on a difference between threshold levels of the two or more logic gates. For example, as illustrated in FIG. 2A, the PUF unit 20a_1 may include a first inverter G21a and a second inverter G22a of the same structure and the first inverter G21a may have its input connected to its output. Therefore, a voltage of a node N20a may have a first threshold level of the first inverter G21a, in other words, a voltage level corresponding to a boundary at which the first inverter G21a distinguishes a low level (e.g., "0") from a high level (e.g., "1"). The second inverter G22a may output a first bit CS[1] of the cell signal CS, which has a level dependent on a second threshold level of the second inverter G22a and the first threshold level of the first inverter G21a. A value, in other words, a voltage level of the first bit CS[1] of the cell signal CS, may be dependent on a difference between the first threshold level and the second threshold level. In FIG. 2A, it is illustrated that the PUF unit 20a_1 includes the first inverter G21a and the second inverter G22a. However, in some embodiments of the inventive concept, the PUF unit may further include additional inverters subsequent to the second inverter G22a and the additional inverters may amplify a voltage level of the node N20a to a low level or a high level by propagating the voltage level of the node N20a.

In addition, the first inverter G21a may consume power caused by the first threshold level, and the second inverter G22a may consume power caused by the difference between the first threshold level and the second threshold level. For example, when the difference between the first threshold level and the second threshold level is small, the second inverter G22a may consume power close to that of the first inverter G21a due to a high current that passes through an electrical path formed between a positive supply voltage and a negative supply voltage (or a ground voltage). On the other hand, when the difference between the first threshold level and the second threshold level is large, the second inverter G22a may consume low power due to a low current that passes through the electrical path formed between the positive supply voltage and the negative supply voltage. For example, the second inverter G22a may consume power dependent on an absolute value of the difference between the first threshold level and the second threshold level.

As described above, since the power consumed by the second inverter G22a depends on an absolute value of the difference between the threshold levels of the logic gates, resistivity against the SCA may be enhanced. For example, when a threshold level of the PUF unit 20a_1 is higher than the first threshold level of the first inverter G21a and the second threshold level of the second inverter G22a, the second inverter G22a may recognize the voltage of the node N20a as having a high level. Accordingly, the first bit CS[1] of the cell signal CS may have a low level. On the other hand, when the first threshold level is lower than the second threshold level, the second inverter G22a may recognize the voltage of the node N20a as having a low level. Accordingly, the first bit CS[1] of the cell signal CS may have a high level. In the two cases just described, when the absolute values of the differences between the first threshold level and the second threshold level are equal, powers consumed by the second inverter G22a may be the same. Therefore, the same power consumption may be measured in the both cases. However, in the both cases, the cell signal CS may have different values. As a result, resistivity against the SCA may be enhanced.

Referring to FIG. 2B, the PUF cell 20b may include a plurality of PUF units 20b_1, 20b_2, . . . , and 20b_w and each of the plurality of PUF units 20b_1, 20b_2, . . . , and 20b_w may include two NAND gates. For example, as illustrated in FIG. 2B, the PUF unit 20b_1 may include a first NAND gate G21b and a second NAND gate G22b having the same structure. The first NAND gate G21b may have its input A connected to its output.

In comparison with the PUF cell 20a of FIG. 2A, the PUF cell 20b of FIG. 2B may receive one bit SEL1[x] of the first selection signal SEL1. For example, as illustrated in FIG. 2B, each of the first NAND gate G21b and the second NAND gate G22b may have an input B that receives the bit SEL1[x] of the first selection signal SEL1. Therefore, when the bit SEL1[x] of the first selection signal SEL1 has a low level, in other words, when the PUF cell 20b is not selected, the first bit CS[1] of the cell signal CS may have a high level. On the other hand, when the bit SEL1[x] of the first selection signal SEL1 has a high level, in other words, when the PUF cell 20b is selected, the node N20b may have the first threshold level of the first NAND gate G21b and the first bit CS[1] of the cell signal CS may have a level dependent on a difference between the first threshold level and a second threshold level of the second NAND gate G22b.

When the PUF block (for example, 11_1 of FIG. 1) includes the PUF cell 20a of FIG. 2A, the PUF block may include a circuit (for example, a multiplexer) for selecting one of the plurality of cell signals CS1, ..., and CSk in response to the first selection signal SEL1. On the other hand, when the PUF block includes the PUF cell 20b of FIG. 2B, a non-selected PUF cell, in other words, a PUF cell that receives one bit of the first selection signal SEL1 having a low level, may output a cell signal having a certain level, and thus, the PUF block may include a logic circuit (for example, 321 of FIG. 3) independent from the first selection signal SEL1. Hereinafter, exemplary embodiments of the inventive concept will be described with reference to the PUF cell that receives one bit of the first selection signal SEL1 as illustrated in FIG. 2B. However, the inventive concept is not limited thereto. In addition, hereinafter, it is assumed that the cell signal output by the PUF cell has the number w of bits (w is an integer greater than 1) as illustrated in FIGS. 2A and 2B.

Figure 3:
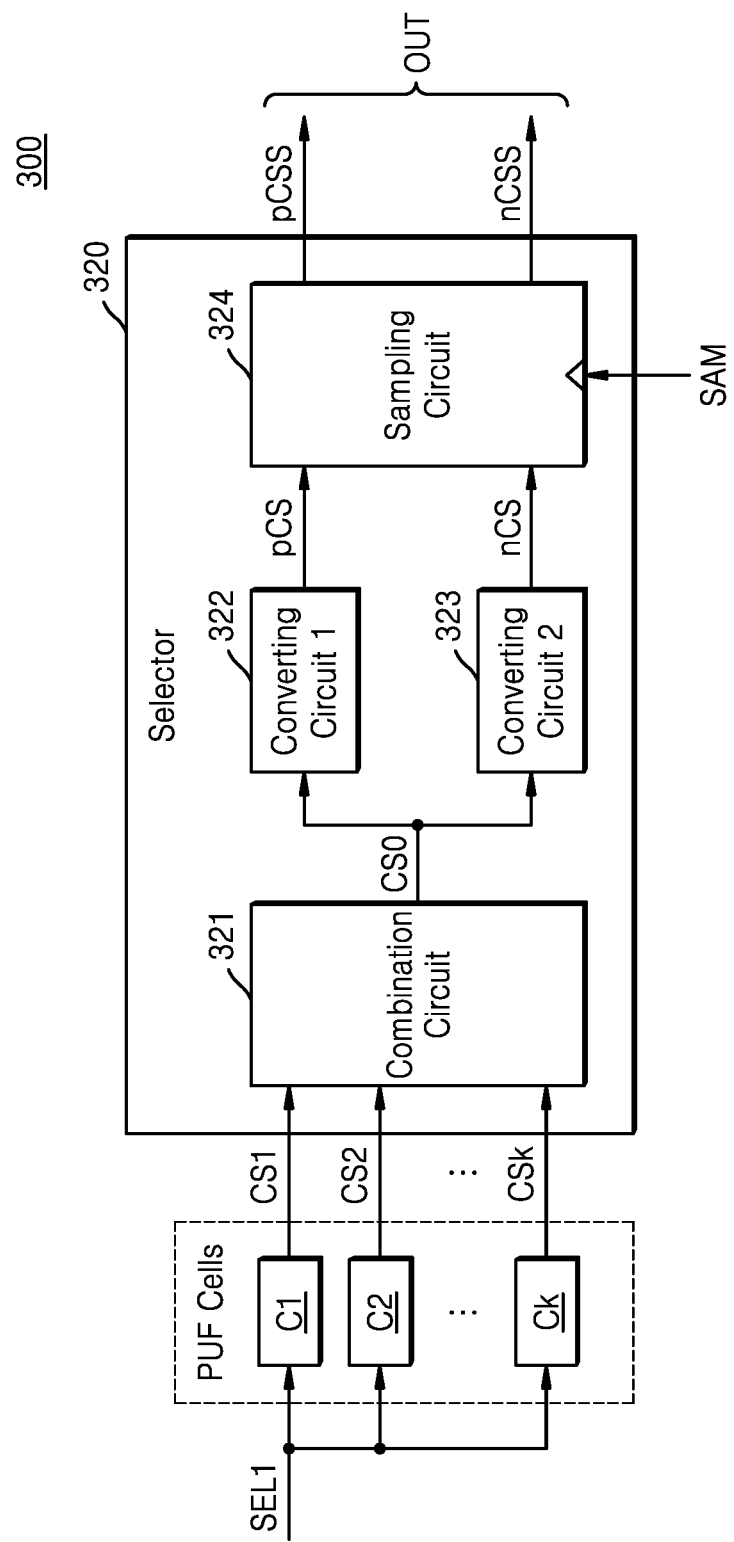
FIG. 3 is a block diagram illustrating a PUF block of FIG. 1 according to an exemplary embodiment of the inventive concept.

FIG. 3 is a block diagram illustrating the PUF block of FIG. 1 according to an exemplary embodiment of the inventive concept. As described above with reference to FIG. 1, a PUF block 300 of FIG. 3 may receive the first selection signal SEL1 and may generate an output signal OUT corresponding to the cell signal of the PUF cell selected, in response to the first selection signal SEL1, from among the plurality of PUF cells C1, C2, ..., and Ck. As illustrated in FIG. 3, the PUF block 300 may include the plurality of PUF cells C1, C2, ..., and Ck and a selector 320. Hereinafter, FIG. 3 will be described with reference to FIG. 1.

The selector 320 may receive the plurality of cell signals CS1, CS2, ..., and CSk from the plurality of PUF cells C1, C2, ..., and Ck, respectively, and may generate a sampled non-inverted cell signal pCSS and a sampled inverted cell signal nCSS as output signals OUT. In other words, the output signals OUT may include the sampled non-inverted cell signal pCSS and the sampled inverted cell signal nCSS. As illustrated in FIG. 3, the selector 320 may include a combination circuit 321, a first converting circuit 322, a second converting circuit 323, and a sampling circuit 324.

The combination circuit 321 may receive the plurality of cell signals CS1, CS2, ..., and CSk and may output the selected cell signal CS0. As described above with reference to FIG. 2B, since the PUF cell that is not selected by the first selection signal SEL1 may generate a cell signal having a previously defined level, the combination circuit 321 may generate the cell signal CS0 selected as a signal dependent on the cell signal output by the PUF cell selected by the first selection signal SEL1. For example, when each of the plurality of PUF cells C1, C2, ..., and Ck includes the PUF unit 20b_1 of FIG. 2B, non-selected PUF cells may generate high level cell signals. In this case, the combination circuit 321 may perform an AND operation or a NAND operation on the plurality of cell signals CS1, CS2, ..., and CSk and may generate the selected cell signal CS0 dependent on the cell signal of the selected PUF cell.

The first converting circuit 322 and the second converting circuit 323 may have the same structure and may both receive the selected cell signal CS0. The first converting circuit 322 may generate a non-inverted cell signal pCS by not inverting the selected cell signal CS0 and the second converting circuit 323 may generate an inverted cell signal nCS by inverting the selected cell signal CS0. Therefore, power consumed by a subsequent sampling circuit 324 as well as by the first converting circuit 322 and the second converting circuit 323 may be uniformly maintained and independent from a value of the selected cell signal CS0.

The first converting circuit 322 and the second converting circuit 323 may also make hamming weight uniform. The hamming weight may refer to the number of different symbols from a zero symbol and may refer to the number of '1's in a multi-bit signal. The SCA may use the hamming weight as well as the power consumption and the total hamming weight of the non-inverted cell signal pCS and the inverted cell signal nCS may be uniformly maintained as the number w of bits of the cell signal. An example of the first converting circuit 322 and the second converting circuit 323 will be described in detail with reference to FIG. 4.

The sampling circuit 324 may generate the sampled non-inverted cell signal pCSS and the sampled inverted cell signal nCSS by sampling the non-inverted cell signal pCS and the inverted cell signal nCS in response to a sampling signal SAM. In some embodiments of the inventive concept, the sampling signal SAM may be provided from the selection signal generator 13 of FIG. 1. In some embodiments of the inventive concept, the sampling circuit 324 may include at least one flip-flop for receiving the sampling signal SAM as a clock signal and receiving the non-inverted cell signal pCS or the inverted cell signal nCS as a data input. In addition, in some embodiments of the inventive concept, the sampling circuit 324 may be omitted and the non-inverted cell signal pCS and the inverted cell signal nCS may be used as the output signals OUT.

Figure 4:
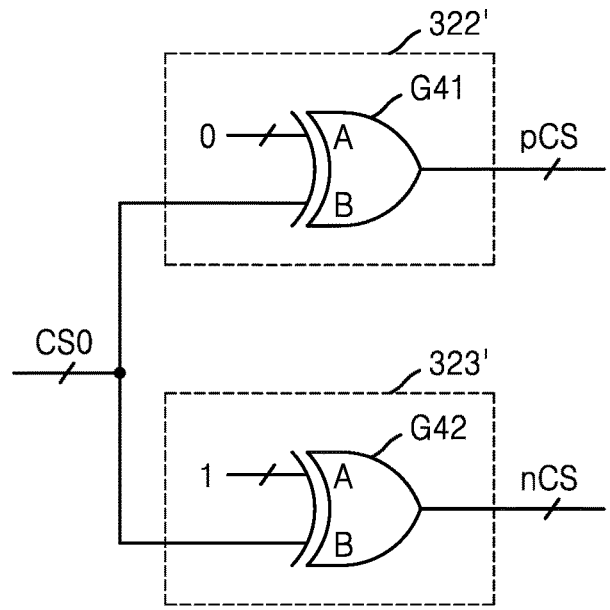
FIG. 4 is a block diagram illustrating a first converting circuit and a second converting circuit of FIG. 3 according to an exemplary embodiment of the inventive concept.

FIG. 4 is a block diagram illustrating the first converting circuit 322 and the second converting circuit 323 of FIG. 3 according to an exemplary embodiment of the inventive concept. As described above with reference to FIG. 3, a first converting circuit 322' of FIG. 4 may generate the non-inverted cell signal pCS by not inverting the selected cell signal CS0 and a second converting circuit 323' may generate the inverted cell signal nCS by inverting the selected cell signal CS0. Hereinafter, FIG. 4 will be described with reference to FIG. 3.

In some embodiments of the inventive concept, the first converting circuit 322 and the second converting circuit 323 of FIG. 3 may include XOR gates, respectively. For example, as illustrated in FIG. 4, the first converting circuit 322' may include a first XOR gate G41 having an input A that receives "0" (e.g., a low level) and an input B that receives the selected cell signal CS0, the second converting circuit 323' may include a second XOR gate G42 having an input A that receives "1" (e.g., a high level) and an input B that receives the selected cell signal CS0, and the first XOR gate G41 and the second XOR gate G42 may process multi-bit signals, respectively. Therefore, the non-inverted cell signal pCS may have the same value as the selected cell signal CS0 and the inverted cell signal nCS may have a value obtained by inverting the value of the selected cell signal CS0. FIG. 4 illustrates only an example of the first converting circuit 322 and the second converting circuit 323 of FIG. 3. In some embodiments of the inventive concept, the first converting circuit 322 and the second converting circuit 323 of FIG. 3 may have the same structure in which the selected cell signal CS0 is not inverted and inverted.

Figure 5:
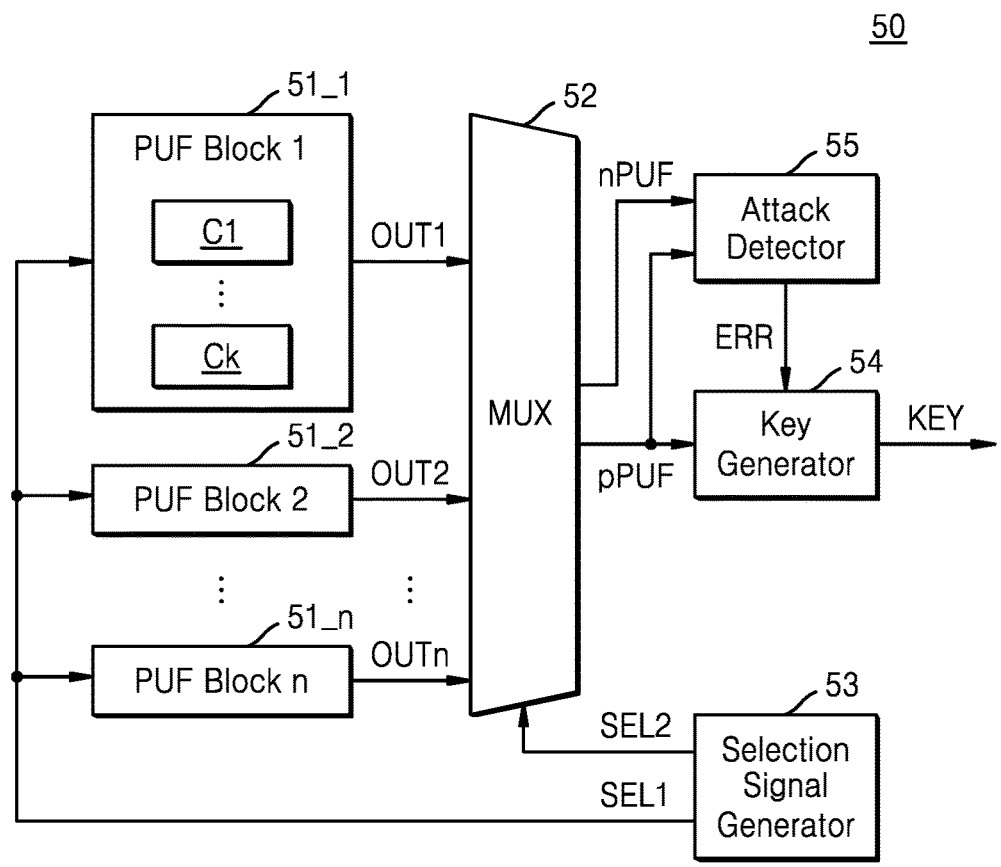
FIG. 5 is a block diagram illustrating an integrated circuit according to an exemplary embodiment of the inventive concept.

FIG. 5 is a block diagram illustrating an integrated circuit 50 according to an exemplary embodiment of the inventive concept. Like the integrated circuit 10 of FIG. 1, the integrated circuit 50 of FIG. 5 may include a plurality of PUF blocks 51_1, 51_2, . . . , and 51_n, a multiplexer (MUX) 52, a selection signal generator 53, and a key generator 54. The integrated circuit 50 of FIG. 5 may further include an attack detector 55. Hereinafter, it is assumed that each of the plurality of PUF blocks 51_1, 51_2, . . . , and 51_n, has the same structure as that of the PUF block 300 of FIG. 3. Therefore, FIG. 5 will be described with reference to FIG. 3. In addition, descriptions of the same components as those in FIG. 3 will not be given.

The plurality of PUF blocks 51_1, 51_2, . . . , and 51_n may generate the plurality of output signals OUT1, OUT2, . . . , and OUTn, respectively, and each of the plurality of PUF blocks 51_1, 51_2, . . . , and 51_n may include the plurality of PUF cells C1, C2, . . . , and Ck. As described above with reference to FIG. 3, the first output signal OUT1 output by one PUF block, for example, the PUF block 51_1, may include the sampled non-inverted cell signal pCSS and the sampled inverted cell signal nCSS. The selection signal generator 53 may generate the first selection signal SEL1 and the second selection signal SEL2. The multiplexer 52 may output a non-inverted PUF signal pPUF and an inverted PUF signal nPUF as PUF signals by selecting one of the plurality of output signals OUT1, OUT2, . . . , and OUTn in response to the second selection signal SEL2.

The attack detector 55 may detect an attack from the outside, for example, a fault insertion attack, based on a comparison between the non-inverted PUF signal pPUF and the inverted PUF signal nPUF. For example, when the non-inverted PUF signal pPUF and the inverted PUF signal nPUF include bits having the same value, the attack detector 55 may determine that the attack occurs. In other words, as described with reference to FIG. 3, due to the first converting circuit 322 and the second converting circuit 323 included in the PUF block 300, in a normal case, the non-inverted PUF signal pPUF and the inverted PUF signal nPUF may have inverted values from each other. However, when the attack is attempted, a value of at least one bit may change until the non-inverted PUF signal pPUF and the inverted PUF signal nPUF are generated. The attack detector 55 may detect the attack by detecting a change in bit value. When the attack is detected, the attack detector 55 may generate an activated error signal ERR and may provide the error signal ERR to the key generator 54. As a result, the first converting circuit 322 and the second converting circuit 323 may both be used to enhance resistivity against the attack as well as detect the attack.

The key generator 54 may receive the non-inverted PUF signal pPUF and may generate the security key KEY based on the non-inverted PUF signal pPUF. In some embodiments of the inventive concept, unlike in FIG. 5, the key generator 54 may receive the inverted PUF signal nPUF and may generate the security key KEY based on the inverted PUF signal nPUF. The key generator 54 may receive the error signal ERR from the attack detector 55 and, when the activated error signal ERR is received, in other words, when the attack against the integrated circuit 50 is detected, the key generator 54 may not generate the security key KEY or may generate a void security key KEY to provide an error in response to the attack.

Figure 6:
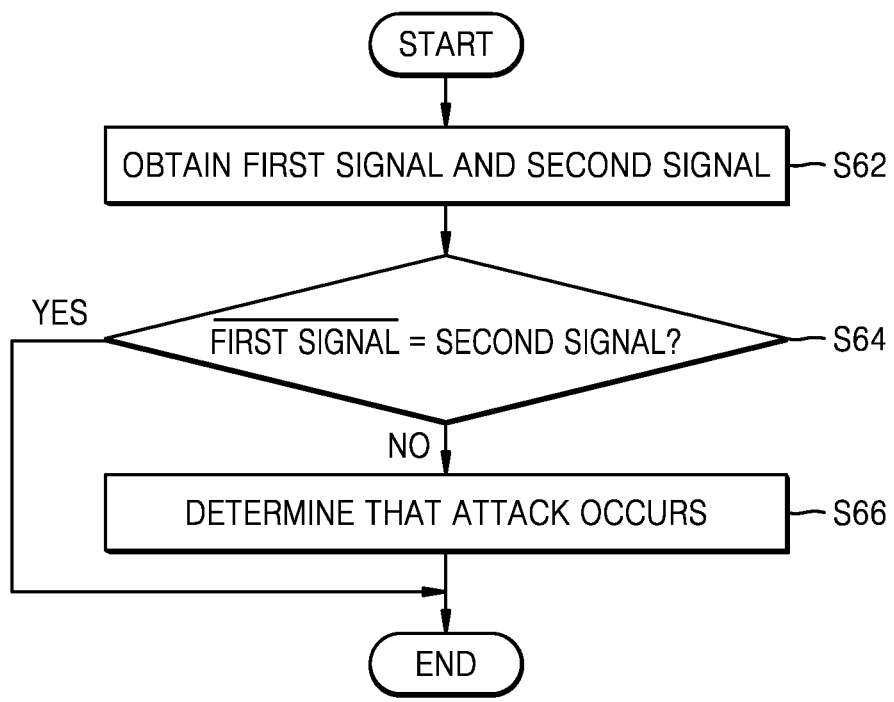
FIG. 6 is a flowchart illustrating a method of detecting an attack against a PUF, according to an exemplary embodiment of the inventive concept.

FIG. 6 is a flowchart illustrating a method of detecting an attack against a PUF, according to an exemplary embodiment of the inventive concept. In some embodiments of the inventive concept, the method of FIG. 6 may be performed by the attack detector 55 of FIG. 5. Hereinafter, FIG. 6 will be described with reference to FIG. 5.

In operation S62, an operation of obtaining a first signal and a second signal may be performed. The first signal and the second signal may have inverted values from each other in a normal case, for example, when an attack does not occur. In other words, the first signal and the second signal may have different values from each other in the normal case. For example, the first signal may correspond to the non-inverted PUF signal pPUF of FIG. 5 and the second signal may correspond to the inverted PUF signal nPUF of FIG. 5. The attack detector 55 may receive the non-inverted PUF signal pPUF and the inverted PUF signal nPUF from the multiplexer 52.

In operation. S64, an operation of comparing the first signal to the second signal may be performed. In some embodiments of the inventive concept, an operation of determining whether a signal obtained by inverting the first signal coincides with the second signal may be performed. For example, the attack detector 55 may perform an XOR operation on corresponding bits of the non-inverted PUF signal pPUF and the inverted PUF signal nPUF and may determine whether a bit having a low level (e.g., "0") exists in a result of the XOR operation. As illustrated in FIG. 6, when the signal obtained by inverting the first signal coincides with the second signal (YES), the method of FIG. 6 may be terminated and the error signal ERR may be maintained to be in an inactive state. On the other hand, when the signal obtained by inverting the first signal is different from the second signal (NO), operation S66 may be subsequently performed.

In operation S66, an operation of determining that the attack occurs may be performed. Since a value of at least one bit is changed due to the attack, the occurrence of the attack may be detected. For example, the attack detector 55 may provide the activated error signal ERR to the key generator 54 in response to the occurrence of the attack.

Figure 7:
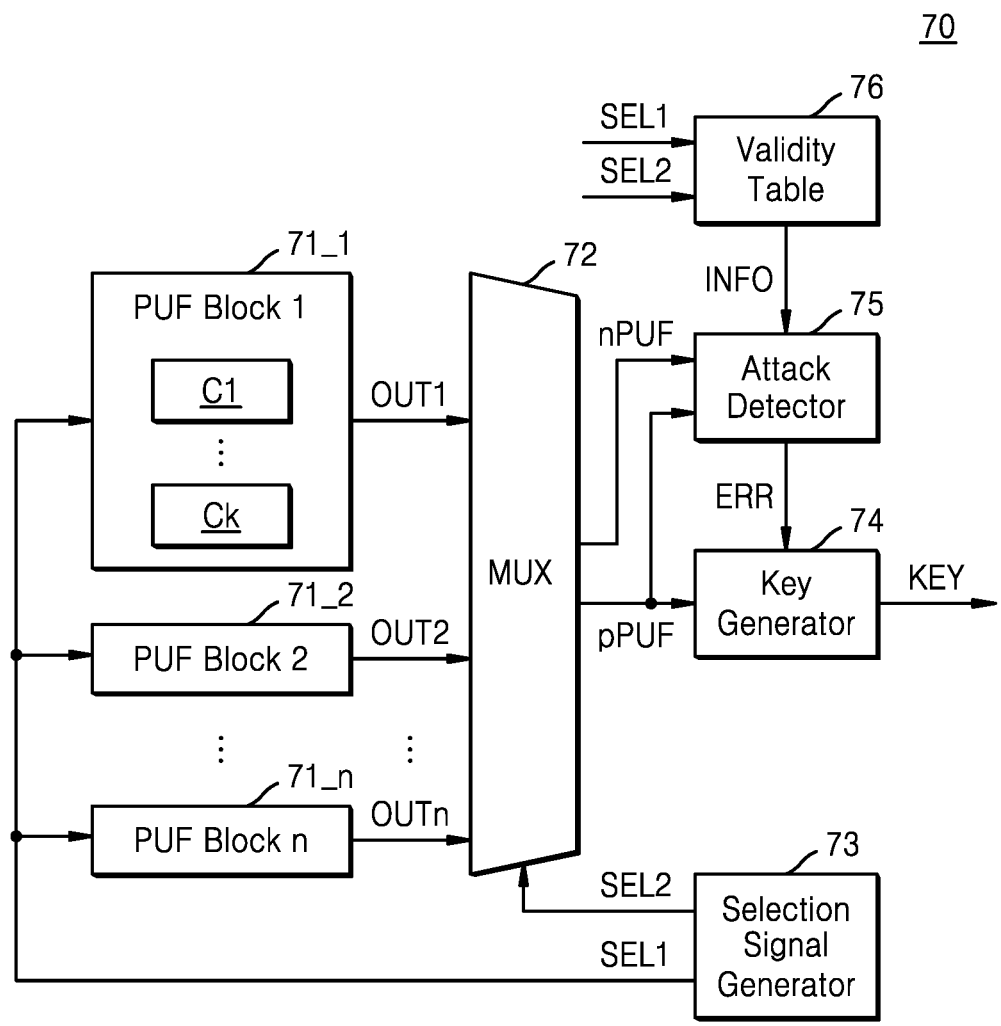
FIG. 7 is a block diagram illustrating an integrated circuit according to an exemplary embodiment of the inventive concept.
Figure 8A:
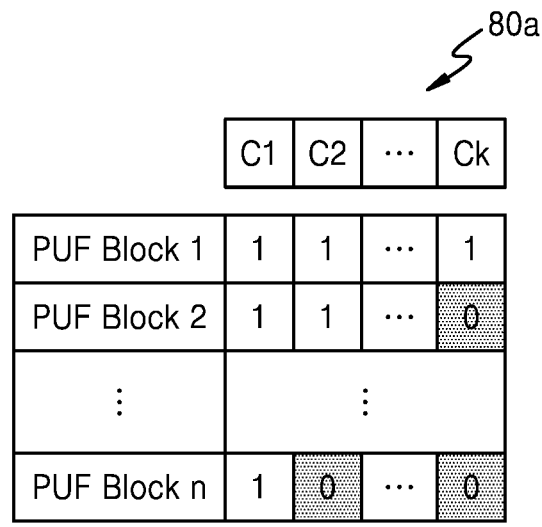
FIGS. 8A and 8B are views illustrating a validity table of FIG. 7 according to exemplary embodiments of the inventive concept.
Figure 8B:
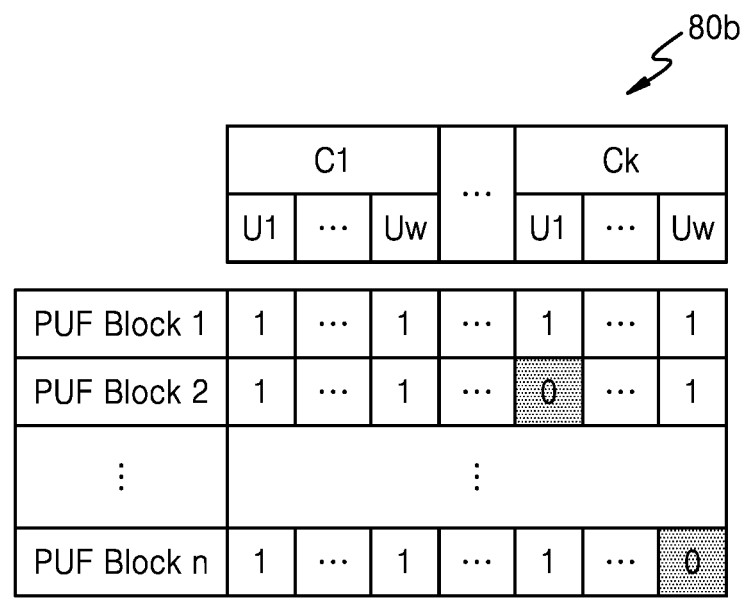

FIG. 7 is a block diagram illustrating an integrated circuit 70 according to an exemplary embodiment of the inventive concept. FIGS. 8A and 8B are views illustrating the validity table 76 of FIG. 7 according to exemplary embodiments of the inventive concept. Like the integrated circuit 50 of FIG. 5, the integrated circuit 70 of FIG. 7 may include a plurality of PUF blocks 71_1, 71_2, . . . , and 71_n, a multiplexer (MUX) 72, a selection signal generator 73, a key generator 74, and an attack detector 75. The integrated circuit 70 may further include a validity table 76. Hereinafter, descriptions of the same components as those in FIG. 1 or 5 will not be given.

Referring to FIG. 7, the plurality of PUF blocks 71_1, 71_2, . . . , and 71_n may generate the plurality of output signals OUT1, OUT2, . . . , and OUTn, respectively, and each of the plurality of PUF blocks 71_1, 71_2, . . . , and 71_n may include the plurality of PUP cells C1, C2, . . . , and Ck. The selection signal generator 73 may generate the first selection signal SEL1 and the second selection signal SEL2. The multiplexer 72 may output the PUF signals including the non-inverted PUF signal pPUF and the inverted PUF signal nPUF by selecting one of the plurality of output signals OUT1, OUT2, . . . , and OUTn in response to the second selection signal SEL2.

The validity table 76 may include information that represents whether the PUF cells included in the integrated circuit 70 are stable PUF cells or unstable PUF cells, in other words, stability information. For example, when each of the plurality of PUF cells C1, C2, . . . , and Ck included in the PUF block 71_1 has the same structure as the PUF cell 20a of FIG. 2A, a PUF unit including the first inverter G21a and the second inverter G22a with a large difference between threshold levels may always generate a signal having a fixed (or stable) level, and a PUF unit including the first inverter G21a and the second inverter G22a with a difference approximately 0 between threshold levels may generate a signal having a varying (or unstable) level. In the current specification, among the PUF cells, a cell that always generates a cell signal having a fixed value may be referred to as a stable PUF cell and a cell that generates a cell signal having a varying value may be referred to as an unstable PUF cell.

Referring to FIG. 8A, in some embodiments of the inventive concept, a validity table 80a may include information that represents whether the PUF cell is the stable PUF cell or the unstable PUF cell. For example, while the first PUF cell C1 of the first PUF block 1 is the stable PUF cell as indicated by "1" in the validity table 80a, the kth PUF cell Ck of the second PUF block 2 may be the unstable PUF cell as indicated by "0" in the validity table 80a. In FIG. 8A, the kth PUF cell Ck of the second PUF block 2 as the unstable PUF cell may include at least one PUF unit for outputting a signal having an unstable level.

Referring to FIG. 8B, in some embodiments of the inventive concept, a validity table 80b may include information that represents whether a PUF unit included in the PUF cell is a stable PUF unit or an unstable PUF unit. For example, while a first PUF unit U1 included in the first PUF cell C1 of the first PUF block 1 is a stable PUF unit as indicated by "1" in the validity table 80b, the first PUF unit U1 included in the kth PUF cell Ck of the second PUF block 2 may be an unstable PUF unit as indicated by "0" in the validity table 80b. In the current specification, in exemplary embodiments of the inventive concept, the validity table 80a of FIG. 8A including the stability information that represents whether the PUF cell is the stable PUF cell or the unstable PUF cell will be mainly described. However, the inventive concept is not limited thereto.

Referring to FIG. 7 again, in some embodiments of the inventive concept, the stability information may be stored in the validity table 76 in a process of manufacturing the integrated circuit 70. For example, the process of manufacturing the integrated circuit 70 may include an enrolment process. In the enrolment process, each of the cell signals of the plurality of PUF cells included in the integrated circuit 70 may be tested. In accordance with the test result, it may be determined whether each of the plurality of PUF cells is the stable PUF cell or the unstable PUF cell. In accordance with the determination result, the stability information may be stored in the validity table 80a. In some embodiments of the inventive concept, as a non-limiting example, the validity table 76 may include a non-volatile memory such as an electrically erasable programmable read-only memory (EEPROM), a flash memory, a phase change random access memory (PRAM), a resistance random access memory (RRAM), a nano-floating gate memory (NFGM), a polymer random access memory (PoRAM), a magnetic random access memory (MRAM), or a ferroelectric random access memory (FRAM). In addition, in some embodiments of the inventive concept, the validity table 76 may include an irreversibly programmable memory.

The attack detector 75 may receive the non-inverted PUF signal pPUF and the inverted PUF signal nPUF and may refer to the validity table 76 to detect the attack. For example, as illustrated in FIG. 7, the validity table 76 may receive the first selection signal SEL1 and the second selection signal SEL2 and may provide the stability information INFO of the PUF cells corresponding to the first selection signal SEL1 and the second selection signal SEL2 to the attack detector 75. When the occurrence of the attack is detected, the attack detector 75 may provide the activated error signal ERR to the key generator 74. An example of the operation of the attack detector 75 will be described later with reference to FIG. 9.

Figure 9:
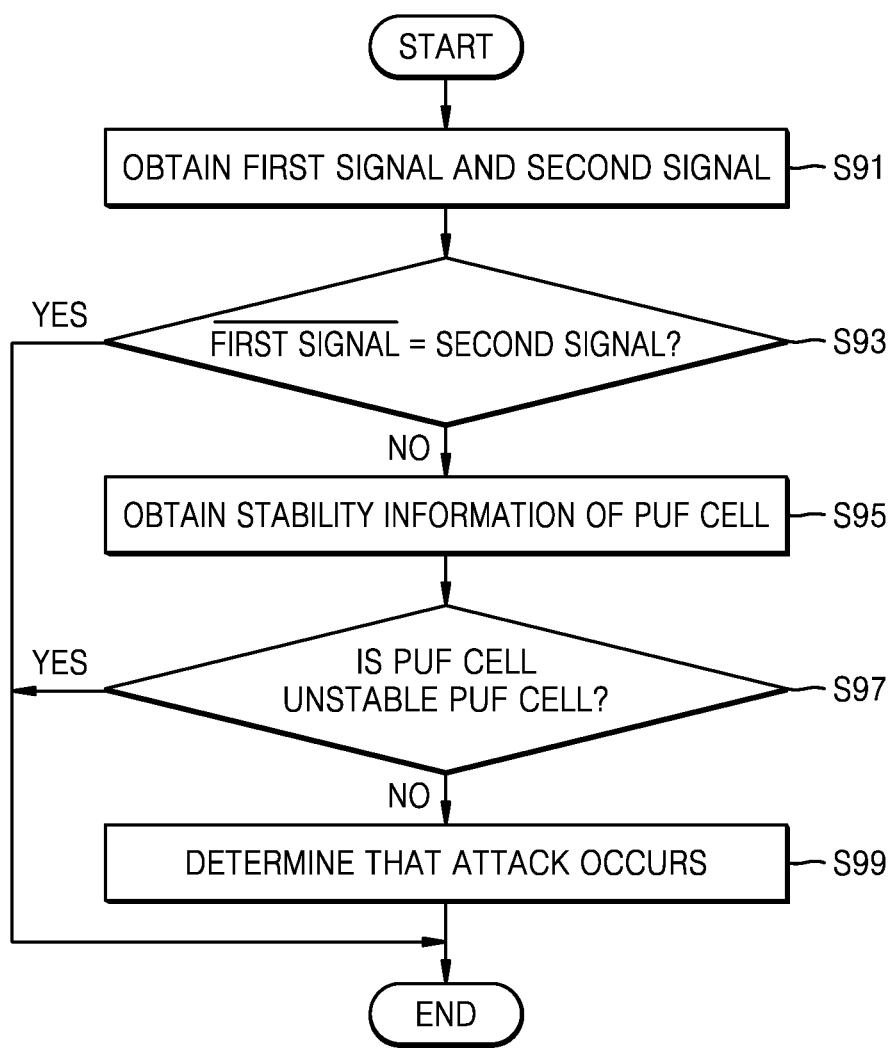
FIG. 9 is a flowchart illustrating a method of detecting an attack against a PUF, according to an exemplary embodiment of the inventive concept.

FIG. 9 is a flowchart illustrating a method of detecting an attack against a PUF according to an exemplary embodiment of the inventive concept. In some embodiments of the inventive concept, the method of FIG. 9 may be performed by the attack detector 75 of FIG. 7. Hereinafter, FIG. 9 will be described with reference to FIG. 7. Descriptions of the same steps as those in FIG. 6 will not be given.

In operation S91, an operation of obtaining the first signal and the second signal may be performed. As described above with reference to FIG. 6, the first signal may correspond to the non-inverted PUF signal pPUF of FIG. 7 and the second signal may correspond to the inverted PUF signal nPUF of FIG. 7. The attack detector 75 may receive the non-inverted PUF signal pPUF and the inverted PUF signal nPUF from the multiplexer 72.

In operation S93, an operation of comparing the first signal with the second signal may be performed. In some embodiments of the inventive concept, an operation of determining whether the signal obtained by inverting the first signal coincides with the second signal may be performed. As illustrated in FIG. 9, when the signal obtained by inverting the first signal coincides with the second signal (YES), the method of FIG. 9 may be terminated and the error signal ERR may be maintained to be in the inactive state. On the other hand, when the signal obtained by inverting the first signal is different from the second signal (NO), operation S95 may be subsequently performed.

In operation S95, an operation of obtaining the stability information of the PUF cells may be performed. For example, the validity table 76 may include the stability information of the PUF cells included in the integrated circuit 70 and may provide the stability information INFO of the PUF cells corresponding to the non-inverted PUF signal pPUF and the inverted PUF signal nPUF to the attack detector 75 in response to the first selection signal SEL1 and the second selection signal SEL2.

In operation S97, an operation of determining whether the PUF cells are the unstable PUF cells may be performed. For example, since the PUF cells correspond to the non-inverted PUF signal pPUF and the inverted PUF signal nPUF, the attack detector 75 may determine whether the PUF cells are the unstable PUF cells based on the stability information obtained in operation S95. As illustrated in FIG. 9, when the PUF cells are the unstable PUF cells (YES), the method of FIG. 9 may be terminated. In other words, it may be determined that in operation S93 the signal obtained by inverting the first signal is different from the second signal due to instability of the PUF cells. Therefore, the method of FIG. 9 may be terminated and the error signal ERR may be kept in the inactive state. On the other hand, when the PUF cells are not the unstable PUF cells (NO), in other words, when the PUF cells are the stable PUF cells, operation S99 may be subsequently performed.

In operation S99, an operation of determining that the attack occurs may be performed. When it is determined in operation S93 that at least one bit value changes and it is determined in operation S97 that the PUF cells are the stable PUF cells, it may be interpreted that the at least one bit value changes due to the attack. Therefore, it may be determined in operation S99 that the attack occurs and the attack detector 75 may provide the activated error signal ERR to the key generator 74 in response to the occurrence of the attack.

Figure 10:
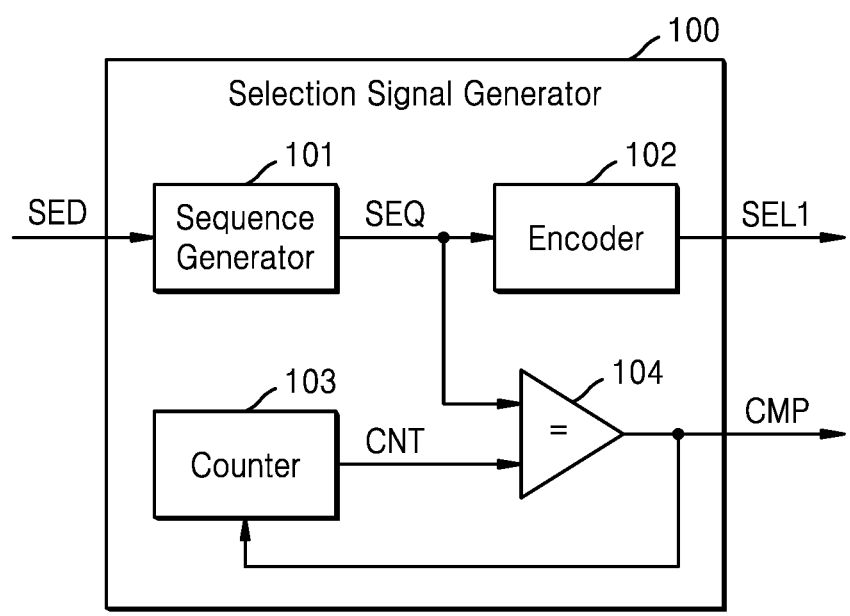
FIG. 10 is a block diagram illustrating a selection signal generator according to an exemplary embodiment of the inventive concept.
Figure 11:
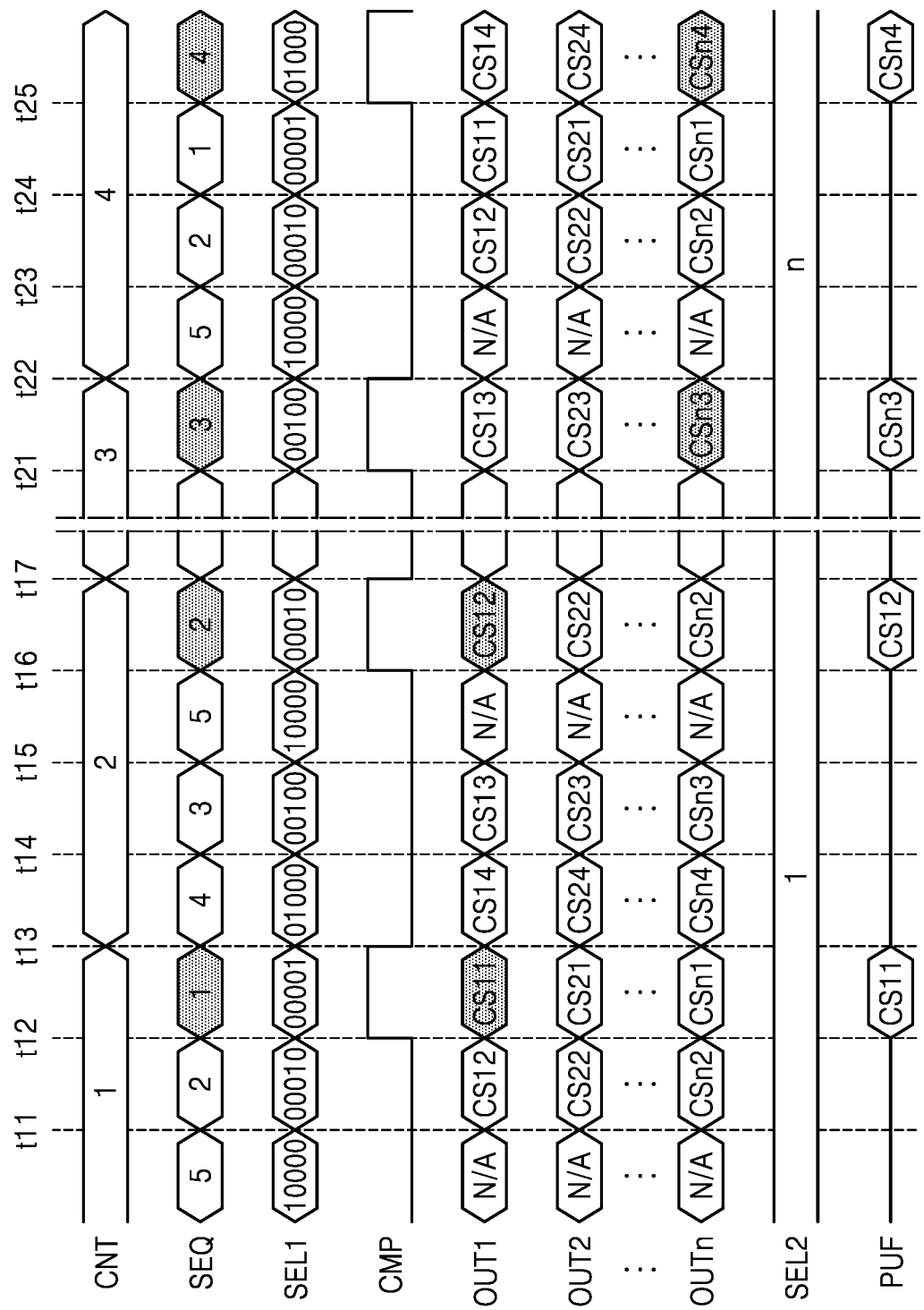
FIG. 11 is a timing diagram illustrating an operation of the selection signal generator of FIG. 10 according to an exemplary embodiment of the inventive concept.

FIG. 10 is a block diagram illustrating a selection signal generator 100 according to an exemplary embodiment of the inventive concept. FIG. 11 is a timing diagram illustrating an operation of the selection signal generator 100 of FIG. 10 according to an exemplary embodiment of the inventive concept. For example, FIG. 10 illustrates an example in which the selection signal generator 100 generates the first selection signal SEL1 for selecting one of the plurality of PUF cells from each of the plurality of PUF blocks. The selection signal generator 100 of FIG. 10 may be an example of the above-described selection signal generators. In addition, FIG. 11 illustrates an example in which a PUF block includes four PUF cells (e.g., k=4) and the first selection signal SEL1 is generated to select one of the four PUF cells. Hereinafter, FIGS. 10 and 11 will be described with reference to FIG. 1.

Referring to FIG. 10, the selection signal generator 100 may receive a seed SED and may generate the first selection signal SEL1. The selection signal generator 100 may include a sequence generator 101, an encoder 102, a counter 103, and a comparator 104.

The sequence generator 101 may receive the seed SED and may generate a sequence SEQ that changes in accordance with the seed SED. For example, as illustrated in FIG. 11, the sequence generator 101 may repeatedly generate a sequence SEQ of "5-2-1-4-3". In some embodiments of the inventive concept, the sequence generator 101 may generate a sequence SEQ that starts from a value determined based on the seed SED among values "5-2-1-4-3". In addition, in some embodiments of the inventive concept, the sequence generator 101 may generate a sequence SEQ in which the order of the values changes based on the seed SED. The seed SED may have low predictability like a random number and may be generated by a varying method. Examples of generating the seed SED will be described later with reference to FIGS. 13A and 13B.

The encoder 102 may receive the sequence SEQ from the sequence generator 101 and may generate the first selection signal SEL1 by encoding the sequence SEQ. In some embodiments of the inventive concept, the encoder 102 may generate the first selection signal SEL1 by one-hot encoding or one-cold encoding the value of the sequence SEQ. For example, as illustrated in FIG. 11, the encoder 102 may one-hot encode the value of the sequence SEQ and may generate the first selection signal SEL1 of 5 bits. Therefore, a PUF cell corresponding to the bit having a value "1" among the bits of the first selection signal SEL1 may be selected. For example, at time t11 to t12, the second PUF cell C2 may be selected from each of the plurality of PUF blocks 11_1, 11_2, . . . , and 11_n in accordance with the first selection signal SEL1 of "00010" and accordingly, the plurality of PUF blocks 11_1, 11_2, . . . , and 11_n may output the plurality of output signals OUT1, OUT2, . . . , and OUTn having values "CS12, CS22, . . . , and CSn2", respectively, corresponding to cell signals generated by the second PUF cell C2. In addition, at time t15 to t16, none of the four PUF cells may be selected in accordance with the first selection signal SEL1 of "10000" and the plurality of output signals OUT1, OUT2, . . . , and OUTn may have void values N/A. The void values N/A of the plurality of output signals OUT1, OUT2, . . . , and OUTn may enhance resistivity against the attack and accordingly, in some embodiments of the inventive concept, a period of the sequence SEQ may be determined to be greater than the number of PUF cells.

The counter 103 may output a count signal CNT counted in accordance with a comparison signal CMP provided by the comparator 104. The comparator 104 may compare the sequence SEQ provided by the sequence generator 101 with the count signal CNT provided by the counter 103 and, when the value of the sequence SEQ coincides with the value of the count signal CNT, may generate the activated comparison signal CMP. For example, as illustrated in FIG. 11, at time t11 to t13, while the counter 103 outputs a count signal CNT having a value "1", the sequence generator 101 may output a sequence SEQ sequentially having values "5-2-1". Therefore, at time t12, the value of the sequence SEQ may coincide with the value of the count signal CNT and the comparison signal CMP may be activated, for example, the comparison signal CMP may be transited to a high level. In response to the activated comparison signal CMP, the counter 103 may increase the count signal CNT and accordingly, from the time t13, the count signal CNT may have a value "2".

The comparison signal CMP may determine a point in time at which a PUF cell is selected, in other words, a point in time at which a cell signal output by the PUF cell is selected. For example, as illustrated in FIG. 11, in the time t12 to the time t13, the plurality of output signals OUT1, OUT2, . . . , and OUTn having the values "CS11, CS21, . . . , and CSn1" corresponding to the cell signals generated by the plurality of first PUF cells may be output in accordance with the activated comparison signal CMP and, due to the second selection signal SEL2 having a value "1", "CS11", which is the value of the first output signal OUT1 output by the PUF block 11_1, may be output as a PUF signal PUF. Similarly, at time t16 to t17, the PUF signal PUF may have the value "CS12" corresponding to the cell signal generated by the second PUF cell of the PUF block 11_1. As the second selection signal SEL2 sequentially increases from 1 to n, the PUF signal PUF may have a value "CSn3" corresponding to the cell signal generated by the third PUF cell of the nth PUF block 11_n at time t21 to t22 and may have a value "CSn4" corresponding to the cell signal generated by the fourth PUF cell of the nth PUF block 11_n at time t25. Therefore, the PUF cells included in the integrated circuit 10 may be sequentially read. In some embodiments of the inventive concept, the comparison signal CMP may be provided to the key generator 14.

In some embodiments of the inventive concept, the second selection signal SEL2 may be generated based on the count signal CNT. For example, in FIG. 11, when the count signal CNT has a value 4, which is the number of PUF cells included in one PUF block, and the comparison signal CMP is activated, the second selection signal SEL2 may increase and n, which is the number of PUF blocks 11_1, 11_2, . . . , and 11_n, may also increase.

As described above, the comparison signal CMP may be non-periodically (or randomly) activated due to the values of the sequence SEQ and, when the seed SED changes, points in time at which the comparison signal CMP is activated may change. Therefore, it is possible to prevent the value of the PUF signal PUF used for generating the security key KEY from being exposed and to enhance resistivity against the attack.

Figure 12:
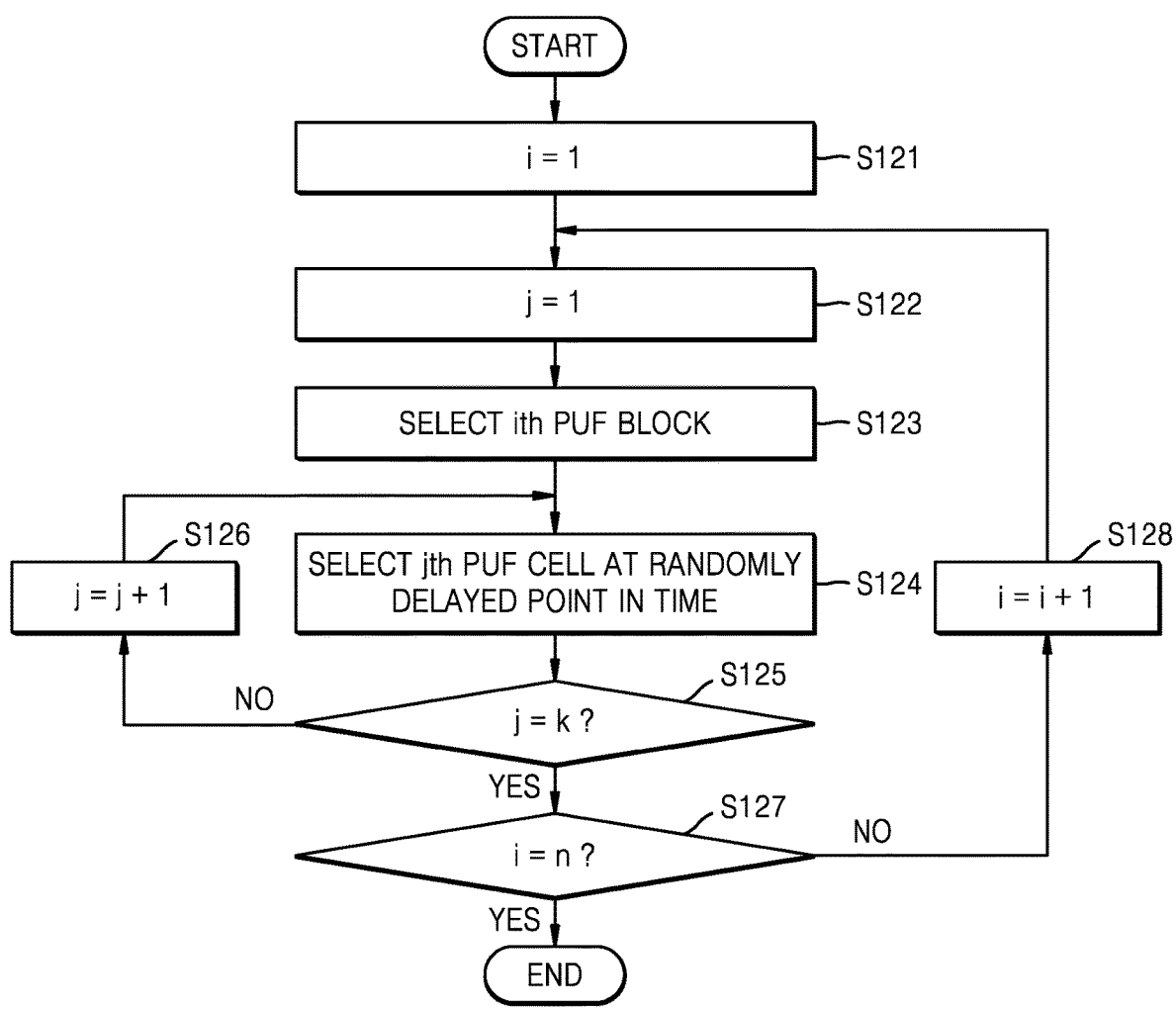
FIG. 12 is a flowchart illustrating a method of reading PUF cells, according to an exemplary embodiment of the inventive concept.

FIG. 12 is a flowchart illustrating a method of reading PUF cells according to an exemplary embodiment of the inventive concept. In some embodiments of the inventive concept, the method of FIG. 12 may be performed by the selection signal generator 13 of FIG. 1. Hereinafter, FIG. 12 will be described with reference to FIG. 1.

Referring to FIG. 12, in operation S121, an operation of setting a variable i as 1 may be performed. The variable i may correspond to an index that indicates one of the plurality of PUF blocks 11_1, 11_2, . . . , and 11_n (1≤i≤n). Next, in operation S122, an operation of setting a variable j as 1 may be performed. The variable j may correspond to an index that indicates one of the plurality of PUF cells C1, . . . , and Ck included in each of the plurality of PUF blocks 11_1, 11_2, . . . , and 11_n (1≤j≤k).

In operation S123, an operation of selecting an ith PUF block 11_i may be performed. For example, the selection signal generator 13 may generate the second selection signal SEL2 and accordingly, an output signal OUT1 is output by the ith PUF block 11_i as the PUF signal PUF. Next, in operation S124, an operation of selecting a jth PUF cell Cj at a point in time randomly delayed may be performed. For example, the selection signal generator 13 may generate the first selection signal SEL1 for selecting the jth PUF cell Cj at the randomly delayed point in time.

In operation S125, an operation of comparing the variable j with the number k of PUF cells included in one PUF block may be performed. When the variable j does not coincide with k, in other words, when a PUF cell that is not selected exists in the ith PUF block 11_i, in operation S126, an operation of increasing the variable j may be performed and then, operation S124 may be performed. On the other hand, when the variable j coincides with k, in other words, when there is no PUF cell that is not selected in the ith PUF block 11_i, operation S127 may be subsequently performed.

In operation S127, an operation of comparing the variable i with the number n of PUF blocks included in the integrated circuit 10 may be performed. When the variable i does not coincide with n, in other words, when a non-selected PUF block exists, in operation S128, an operation of increasing the variable i may be performed and then, operation S122 may be performed. On the other hand, when the variable i coincides with n, in other words, when there is no PUF block that is not selected, the method of FIG. 12 may be terminated.

Figure 13A:
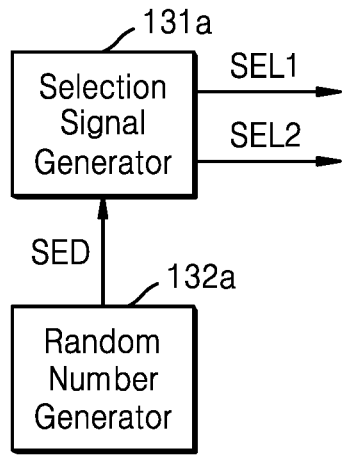
FIGS. 13A and 13B are block diagrams illustrating how seeds are generated according to exemplary embodiments of the inventive concept.
Figure 13B:
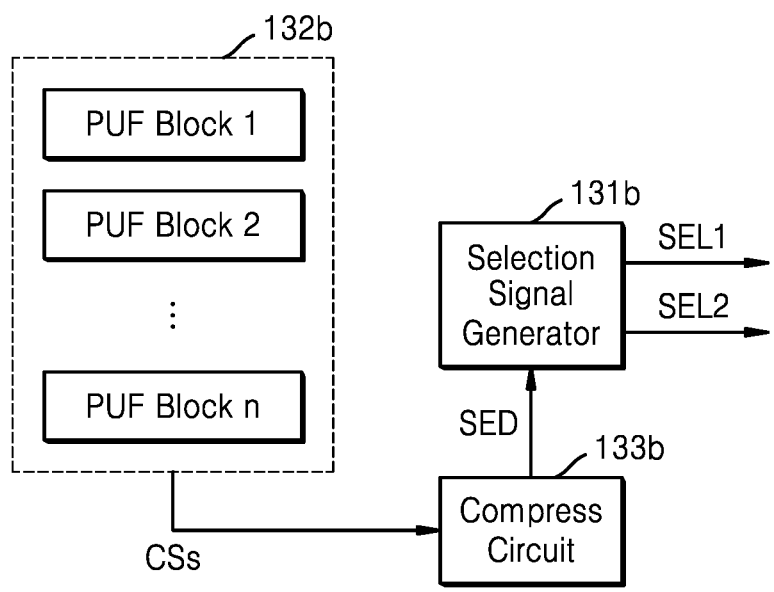

FIGS. 13A and 13B are block diagrams illustrating examples in which seeds are generated according to exemplary embodiments of the inventive concept. As described above with reference to FIG. 10, the seed SED may change a method, performed by selection signal generators 131a and 131b of FIGS. 13A and 13B, of generating the first selection signal SEL1 and/or the second selection signal SEL2. As a result, the plurality of PUF cells may be differently (for example, at changed points in time) selected in accordance with the seed SED. Hereinafter, descriptions of the same components as those in FIG. 10 will not be given.

Referring to FIG. 13A, the seed SED may be generated by a random number generator 132a. The random number generator 132a may generate a random number and may provide the seed SED having a value of the random number or a value obtained by processing the random number to the selection signal generator 131a. The random number generator 132a may generate the random number by a varying method. In some embodiments of the inventive concept, the random number generator 132a may include a true random number generator (TRNG) and/or a pseudo random number generator (PRNG).

Referring to FIG. 13B, the seed SED may be generated based on cell signals CSs generated by the PUF cells. As described above with reference to FIGS. 7, 8A, and 8B, a plurality of PUF blocks 132b may include unstable PUF cells as well as stable PUF cells and accordingly, values of the cell signals CSs may be unstable. As illustrated in FIG. 13B, the cell signals CSs generated by at least parts of the PUF cells included in the plurality of PUF blocks 132b may be provided to a compress circuit 133b.

The compress circuit 133b may generate the seed SED based on the cell signals CSs. To increase entropy of the seed SED, the number of PUF cells that provide the cell signals CSs may be large. Therefore, the compress circuit 133b may generate the seed SED dependent on the cell signals CSs by compressing the cell signals CSs. In some embodiments of the inventive concept, the compress circuit 133b may generate the seed SED by performing an XOR operation on the cell signals CSs and may provide the generated seed SED to the selection signal generator 131b. Since the seed SED is generated based on instability of the PUF cells, the PUF cells may be used for increasing resistivity against the attack as well as performing a PUF.

Figure 14:
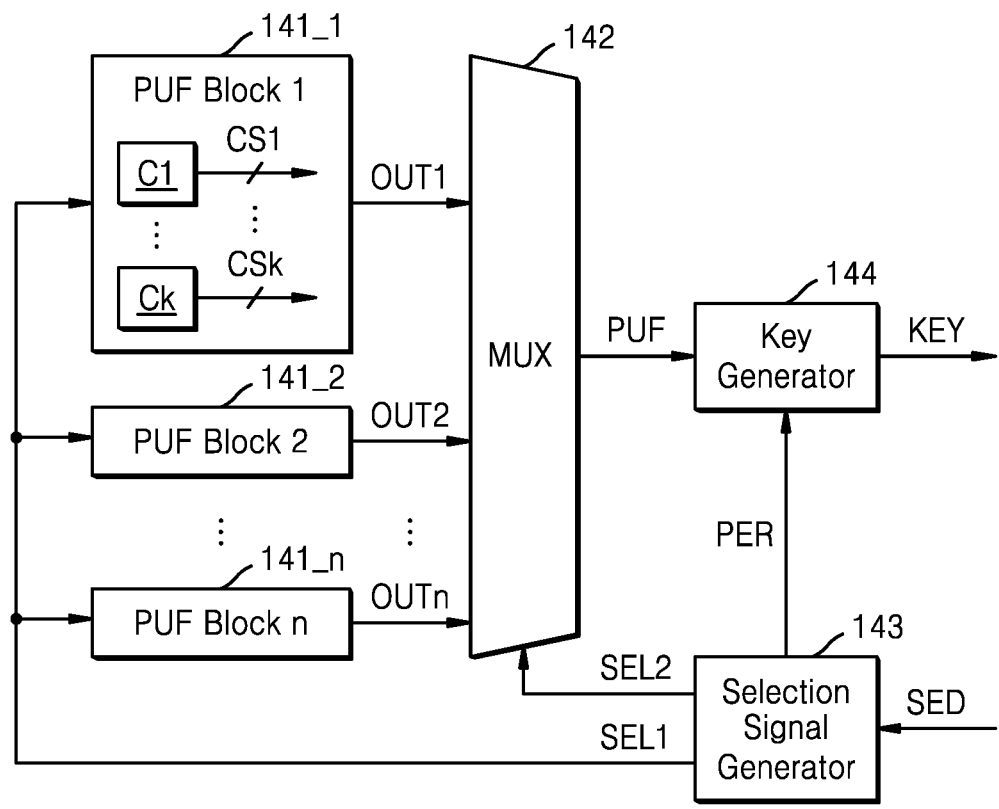
FIG. 14 is a block diagram illustrating an integrated circuit according to an exemplary embodiment of the inventive concept.

FIG. 14 is a block diagram illustrating an integrated circuit 140 according to an exemplary embodiment of the inventive concept. Like the integrated circuit 10 of FIG. 1, the integrated circuit 140 of FIG. 14 may include a plurality of PUF blocks 141_1, 141_2, . . . , and 141_n, a multiplexer (MUX) 142, a selection signal generator 143, and a key generator 144. Descriptions of the same components as those in FIG. 1 will not be given.

Referring to FIG. 14, the plurality of PUF blocks 141_1, 141_2, . . . , and 141_n may generate the plurality of output signals OUT1, OUT2, . . . , and OUTn, respectively, and each of the plurality of PUF blocks 141_1, 141_2, . . . , and 141_n may include the plurality of PUF cells C1, C2, . . . , and Ck. The selection signal generator 143 may generate the first selection signal SEL1 and the second selection signal SEL2. The multiplexer 142 may output the PUF signals PUF by selecting one of the plurality of output signals OUT1, OUT2, . . . , and OUTn in response to the second selection signal SEL2.

In some embodiments of the inventive concept, the selection signal generator 143 may generate a permutation signal PER and may provide the generated permutation signal PER to the key generator 144. As described above, the selection signal generator 143 may generate the first selection signal SEL1 and the second selection signal SEL2 so that the n*k PUF cells included in the plurality of PUF blocks 141_1, 141_2, . . . , and 141_n are selected one by one with nothing omitted. In the example of FIG. 14, the selection signal generator 143 may change the order in which the n*k PUF cells are selected. In other words, the selection signal generator 143 may generate a permutation of the n*k PUF cells and may generate the first selection signal SEL1 and the second selection signal SEL2 so that the n*k PUF cells are selected in accordance with the permutation. The key generator 144 may receive the permutation signal PER that represents the permutation generated by the selection signal generator 143 to recognize the PUF cells corresponding to the PUF signals PUF. In some embodiments of the inventive concept, as illustrated in FIG. 14, the selection signal generator 143 may generate the permutation based on the seed SED. An example of the operation of the selection signal generator 143 will be described later with reference to FIG. 15.

Figure 15:
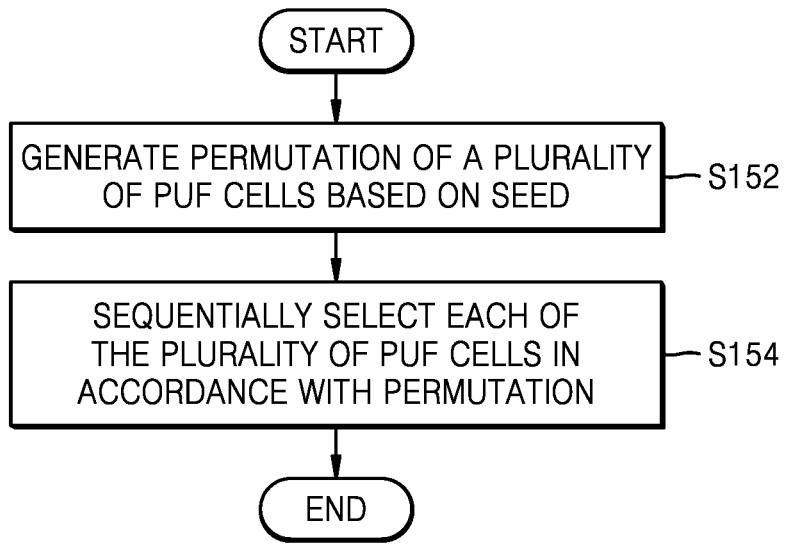
FIG. 15 is a flowchart illustrating a method of reading PUF cells, according to an exemplary embodiment of the inventive concept.

FIG. 15 is a flowchart illustrating a method of reading PUF cells, according to an exemplary embodiment of the inventive concept. In some embodiments of the inventive concept, the method of FIG. 15 may be performed by the selection signal generator 143 of FIG. 14. Hereinafter, FIG. 15 will be described with reference to FIG. 14.

Referring to FIG. 15, in operation S152, an operation of generating the permutation of the plurality of PUF cells based on the seed SED may be performed. For example, the selection signal generator 143 may generate the permutation to select the n*k PUF cells one by one with nothing omitted and to change the order in which the n*k PUF cells are selected. The permutation may be generated based on the seed SED and the order in which the n*k PUF cells are selected may change due to the permutation that changes in accordance with the seed SED. In addition, the selection signal generator 143 may provide the permutation signal PER that represents the generated permutation to the key generator 144. In some embodiments of the inventive concept, the selection signal generator 143 may generate the permutation for some of the n*k PUF cells. For example, the selection signal generator 143 may generate the permutation for the k PUF cells included in one PUF block and may generate the permutation for the n PUF blocks.

In operation S154, an operation of sequentially selecting the plurality of PUF cells in accordance with the permutation may be performed. For example, the selection signal generator 143 may generate the first selection signal SEL1 and the second selection signal SEL2 to sequentially select the plurality of PUF cells in accordance with the permutation. In some embodiments of the inventive concept, when the selection signal generator 143 generates the permutation for the k PUF cells included in one PUF block, the selection signal generator 143 may generate the first selection signal SEL1 in accordance with the generated permutation. In addition, in some embodiments of the inventive concept, when the selection signal generator 143 generates the permutation for the n PUF blocks, the second selection signal SEL2 may be generated in accordance with the generated permutation.

Figure 16A:
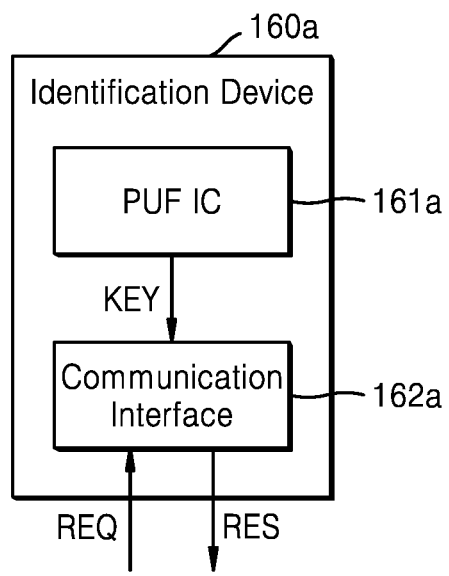
FIGS. 16A, 16B and 16C are block diagrams of a device including an integrated circuit for security of a PUF according to an exemplary embodiment of the inventive concept.
Figure 16B:
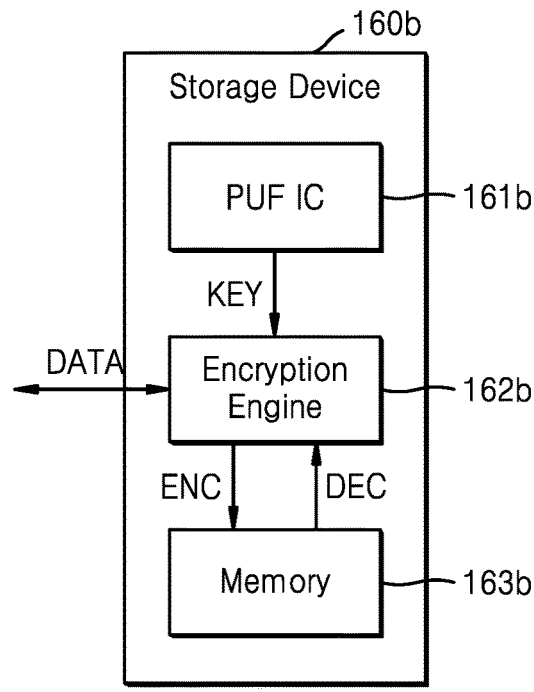
Figure 16C:
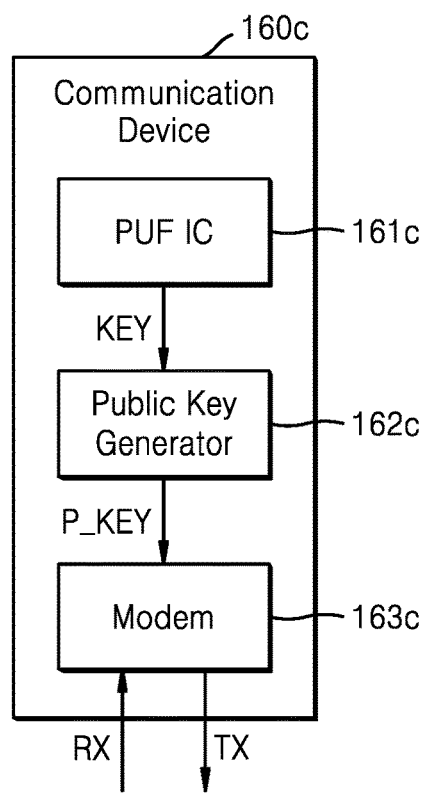

FIGS. 16A to 16C are block diagrams of a device including an integrated circuit for security of a PUF according to an exemplary embodiment of the inventive concept. As described above, the integrated circuit may include the PUF cells that increase resistivity against the attack and may have a structure in which the predictability of the operation of reading the PUF cells deteriorates. In identification devices 160a, 160b, and 160c of FIGS. 16A to 16C, the integrated circuits according to the exemplary embodiments of the inventive concept may be included as PUF integrated circuits (IC) 161a, 161b, and 161c, respectively. In addition, components included in the identification devices 160a, 160b, and 160c may be implemented as independent integrated circuits, respectively. At least two of the components included in each of the identification devices 160a, 160b, and 160c may be implemented as one integrated circuit.

Referring to FIG. 16A, the identification device 160a may include the PUF IC 161a and a communication interface 162a. The identification device 160a may transmit a response RES including identification information of the identification device 160a to the outside in response to a request REQ received from the outside. For example, the identification device 160a may be a radio frequency identification (RFID) device and the identification information included in the response RES may be used to identify a user of the identification device 160a. The identification information included in the response RES may be generated based on the security key KEY generated by the PUF IC 161a.

Referring to FIG. 16B, the identification device 160b may include the PUF IC 161b, an encryption engine 162b, and a memory 163b. The identification device 160b may store data DATA received from the outside or may transmit the stored data DATA to the outside. The encryption engine 162b may encrypt the data DATA received from the outside by using the security key KEY, generated by the PUF IC 161b for security of the stored data and may store encrypted data ENC in the memory 163b. In addition, the encryption engine 162b may decode the encrypted data ENC read from the memory 163b by using the security key KEY and may transmit the decoded data DATA to the outside. In FIG. 16B, the decoded data read from the memory 163b is represented as DEC. For example, the identification device 160b may be a portable storage device or a storage device of a storage server.

Referring to FIG. 16C, the identification device 160c may include the PUF IC 161c, a public key generator 162c, and a modem 163c. The identification device 160c may communicate with another communication device by receiving a signal RX from the another communication device or transmitting a signal TX to the another communication device. The public key generator 162c may generate a public key P_KEY based on the security key KEY generated by the PUF IC 161c. The modem 163c may transmit the encrypted signal TX or may decrypt the signal RX based on the public key P_KEY. In other words, the identification device 160c may perform a secure communication with another communication device based on the security key KEY. For example, the identification device 160c may be a portable wireless communication device.

Exemplary embodiments of the inventive concept provide an integrated circuit for security of a PUF and a device including the same. More particularly exemplary embodiments of the inventive concept provide an integrated circuit for providing an effective countermeasure against various SCAs against the PUF and a device including the same.

While the inventive concept has been particularly shown and described with reference to exemplary embodiments thereof, it will be understood that various changes in form and details may be made thereto without departing from the spirit and scope of the inventive concept as defined by the following claims.

What is claimed is:

1. An integrated circuit (IC), comprising:
   a plurality of physically unclonable function (PUF) cells each configured to generate a cell signal having a unique value;
   a combination circuit configured to receive a plurality of signals from the plurality of PUF cells and output a combined signal, wherein the combination circuit is configured to perform a NAND operation;
   a first XOR gate configured to receive a low level as a first input and receive the combined signal as a second input, wherein the first XOR gate is configured to output a first digital signal;
   a second XOR gate configured to receive a high level as a first input and receive the combined signal as a second input, wherein the second XOR configured gate is to output a second digital signal;
   wherein the second digital signal is an inverted signal of the first digital signal.

2. The IC of claim 1, further comprising at least one flip-flop configured to receive the first digital signal and the second digital signal and generate a sampled first signal and a sampled second signal.

3. The IC of claim 2, wherein the sampled first signal and the sampled second signal are inputted to a multiplexer.

4. The IC of claim 2, further comprising a key generator configured to receive the sampled first signal.

5. The IC of claim 4, wherein a security key is generated based on the sampled first signal.

6. The IC of claim 2, wherein an XOR operation is performed on the sampled first signal and the sampled second signal.

7. The IC of claim 6, wherein a fault insertion attack is detected based on a result of the XOR operation.

8. The IC of claim 1, wherein each of the plurality of PUF cells comprises a first logic gate and a second logic gate, and
wherein the unique value of the cell signal output by a first PUF cell of the plurality of PUF cells is determined based on a difference between threshold levels of the first logic gate and the second logic gate.

9. An integrated circuit (IC), comprising:
a selection signal generator configured to generate a first selection signal and a second selection signal;
a plurality of physically unclonable function (PUF) blocks each configured to receive the first selection signal and each configured to generate a first output signal and a second output signal;
a multiplexer configured to receive the second selection signal from the selection signal generator and a plurality of first output signals from the plurality of PUF blocks, and further configured to output one of the plurality of first output signals;
a key generator configured to receive the one of the plurality of first output signals and generate a security key;
wherein each of the plurality of PUF blocks comprises at least one XOR gate and a plurality of PUF cells, wherein the output of the plurality of PUF cells is transmitted to the at least one XOR gate to generate an inverted signal and a non-inverted signal.

10. The IC of claim 9, wherein the second output signal is an inverted signal of the first output signal.

11. The IC of claim 9, wherein each of the plurality of PUF blocks comprises a plurality of PUF cells configured to generate cell signals having unique values, respectively.

12. The IC of claim 9, wherein each of the PUF blocks is configured to generate an output signal based on a cell signal output by a PUF cell selected from the PUF cells in response to the first selection signal.

13. The IC of claim 9, wherein the selection signal generator is configured to generate the first selection signal so that all of a plurality of PUF cells included in each of the plurality of PUF blocks are selected one-by-one.

14. The IC of claim 13, wherein the selection signal generator is configured to generate the first selection signal so that the plurality of PUF cells are respectively selected at randomly delayed points in time.

15. The IC of claim 9, wherein the plurality of PUF blocks are divided into two or more groups each of which includes a same number of PUF blocks, wherein the selection signal generator is configured to enable one of the two or more groups, and
wherein a plurality of PUF cells included in an enabled group are configured to generate output signals.

16. The IC of claim 9, further comprising at least one flip-flop configured to receive the inverted signal and the non-inverted signal and generate the first output signal and the second output signal.

17. An integrated circuit (IC), comprising:
a physically unclonable function (PUF) block configured to output a first signal and a second signal, wherein the second signal is an inverted signal of the first signal;
a key generator configured to receive the first signal or the second signal and generate a security key;
an attack detector configured to receive the first signal and the second signal, and further configured to perform an XOR operation on the first signal and the second signal and further configured to output the result of the XOR operation to the key generator.

18. The IC of claim 17, wherein a multiplexer is connected between the PUF block and the attack detector.

19. The IC of claim 17, wherein a multiplexer is connected between the PUF block and the key generator.

20. The IC of claim 17, wherein the PUF block comprises a plurality of PUF cells configured to generate cell signals having unique values.

21. The IC of claim 20, wherein the PUF block comprises at least one XOR gate, wherein the at least one XOR gate receives an output of the plurality of PUF cells to generated the first signal and the second signal.

* * * * *